US008248226B2

(12) United States Patent
Friar

(10) Patent No.: US 8,248,226 B2
(45) Date of Patent: Aug. 21, 2012

(54) SYSTEM AND METHOD FOR MONITORING SECURITY AT A PREMISES

(75) Inventor: Gary Friar, Saint Cloud, FL (US)

(73) Assignee: Black & Decker Inc., Newark, DE (US)

( * ) Notice: Subject to any disclaimer, the term of this patent is extended or adjusted under 35 U.S.C. 154(b) by 771 days.

(21) Appl. No.: 11/269,380

(22) Filed: Nov. 8, 2005

(65) Prior Publication Data

US 2006/0104312 A1 May 18, 2006

Related U.S. Application Data

(60) Provisional application No. 60/628,357, filed on Nov. 16, 2004.

(51) Int. Cl.
*H04N 7/18* (2006.01)

(52) U.S. Cl. ....................................... 340/506; 348/143

(58) Field of Classification Search .................. 370/506, 370/505, 503, 498; 348/32, 37, 38, 45, 42, 348/143, 61, 573, 572, 571; 340/521, 517, 340/501, 500, 575, 573, 506
See application file for complete search history.

(56) References Cited

U.S. PATENT DOCUMENTS

| | | | |
|---|---|---|---|
| 3,074,053 | A | 1/1963 | McDonough et al. |
| 3,109,165 | A | 10/1963 | Bagno |
| 3,383,678 | A | 5/1968 | Palmer |
| 3,404,393 | A | 10/1968 | Blivice et al. |
| 3,437,759 | A | 4/1969 | McKinzie |
| 3,461,241 | A | 8/1969 | Menke |
| 3,488,436 | A | 1/1970 | Burney |
| 3,537,095 | A | 10/1970 | Cones |
| 3,573,817 | A | 4/1971 | Akers |
| 3,610,822 | A | 10/1971 | Ingham et al. |
| 3,662,112 | A | 5/1972 | Martin |
| 3,833,897 | A | 9/1974 | Bell et al. |
| 3,838,408 | A | 9/1974 | McMaster |
| 3,883,695 | A | 5/1975 | Bickel et al. |
| 4,001,771 | A | 1/1977 | Amrine et al. |
| 4,023,139 | A | 5/1977 | Samburg |
| 4,060,803 | A | 11/1977 | Ashworth, Jr. |
| 4,241,335 | A | 12/1980 | Barnes |
| 4,249,207 | A | 2/1981 | Harman et al. |

(Continued)

FOREIGN PATENT DOCUMENTS

| | | |
|---|---|---|
| EP | 1014325 | 6/2000 |

(Continued)

OTHER PUBLICATIONS

U.S. Appl. No. 60/628,357 (See Figs. 1 and 14, paragraphs [0002]-[0004], paragraph [0009], paragraph [0019], paragraphs [0024]-[0028], last two sentences of paragraph [0030], first sentence of paragraph [0031], second and third sentences of paragraph [0032], paragraph [0045], last four sentences of paragraph [0046], and first three sentences of paragraph [0056]).

*Primary Examiner* — Michael T. Thier
*Assistant Examiner* — Prince A Mensah
(74) *Attorney, Agent, or Firm* — Adan Ayala

(57) ABSTRACT

Digital audio sensors receive and digitize audio signals and transmit the digitized signals to a central monitoring station for monitoring by an operator. The system can allow load balancing and other improvements.

19 Claims, 13 Drawing Sheets

U.S. PATENT DOCUMENTS

| | | | | |
|---|---|---|---|---|
| 4,283,717 | A | 8/1981 | Caldwell et al. | |
| 4,321,593 | A | 3/1982 | Ho et al. | |
| 4,333,170 | A | 6/1982 | Mathews et al. | |
| 4,538,139 | A | 8/1985 | Clemente | |
| 4,633,234 | A | 12/1986 | Gagnon | |
| 4,706,069 | A | 11/1987 | Tom et al. | |
| 4,707,604 | A | 11/1987 | Guscott | |
| 4,709,151 | A | 11/1987 | Guscott et al. | |
| 4,728,935 | A | 3/1988 | Pantus et al. | |
| 4,728,936 | A | 3/1988 | Guscott et al. | |
| 4,749,871 | A | 6/1988 | Galvin et al. | |
| 4,758,827 | A | 7/1988 | Powers | |
| 4,796,025 | A | 1/1989 | Farley et al. | |
| 4,812,820 | A | 3/1989 | Chatwin | |
| 4,821,027 | A | 4/1989 | Mallory et al. | |
| 4,827,247 | A | 5/1989 | Giffone | |
| 4,839,640 | A | 6/1989 | Ozer et al. | |
| 4,843,462 | A | 6/1989 | Roy et al. | |
| 4,850,018 | A | 7/1989 | Vogt | |
| 4,853,685 | A | 8/1989 | Vogt | |
| 4,857,912 | A | 8/1989 | Everett, Jr. et al. | |
| 4,876,597 | A | 10/1989 | Roy et al. | |
| 4,893,328 | A | 1/1990 | Peacock | |
| 4,952,931 | A | 8/1990 | Serageldin et al. | |
| 5,023,901 | A | 6/1991 | Sloan et al. | |
| 5,091,780 | A | 2/1992 | Pomerleau | |
| 5,109,278 | A | 4/1992 | Erickson et al. | |
| 5,111,291 | A | 5/1992 | Erickson et al. | |
| 5,144,661 | A | 9/1992 | Shamosh et al. | |
| 5,150,099 | A | 9/1992 | Lienau | |
| 5,168,262 | A | 12/1992 | Okayama | |
| 5,173,932 | A | 12/1992 | Johansson et al. | |
| 5,249,223 | A | 9/1993 | Vanacore | |
| 5,398,277 | A | 3/1995 | Martin, Jr. et al. | |
| 5,400,011 | A * | 3/1995 | Sutton | 340/566 |
| 5,406,254 | A | 4/1995 | Le Nay et al. | |
| 5,436,610 | A | 7/1995 | Ballesty et al. | |
| 5,471,194 | A | 11/1995 | Guscott | |
| 5,506,567 | A | 4/1996 | Bichlmaier et al. | |
| 5,513,244 | A | 4/1996 | Joao et al. | |
| 5,532,670 | A | 7/1996 | Issa et al. | |
| 5,534,845 | A | 7/1996 | Issa et al. | |
| 5,543,783 | A | 8/1996 | Clark et al. | |
| 5,555,404 | A | 9/1996 | Torbjørnsen et al. | |
| 5,557,254 | A | 9/1996 | Johnson et al. | |
| 5,629,687 | A | 5/1997 | Sutton et al. | |
| 5,646,591 | A | 7/1997 | Issa et al. | |
| 5,675,320 | A | 10/1997 | Cecic et al. | |
| 5,680,096 | A | 10/1997 | Grasmann | |
| 5,682,133 | A | 10/1997 | Johnson et al. | |
| 5,736,927 | A | 4/1998 | Stebbins et al. | 340/506 |
| 5,751,209 | A | 5/1998 | Werner et al. | |
| 5,783,989 | A | 7/1998 | Issa et al. | |
| 5,784,323 | A | 7/1998 | Adams et al. | |
| 5,798,711 | A | 8/1998 | Issa et al. | |
| 5,812,054 | A | 9/1998 | Cohen | |
| 5,815,198 | A | 9/1998 | Vachtsevanos et al. | |
| 5,818,334 | A | 10/1998 | Stanley | |
| 5,862,201 | A | 1/1999 | Sands | |
| 5,862,527 | A | 1/1999 | Trevino | |
| 5,872,519 | A | 2/1999 | Issa et al. | |
| 5,886,620 | A | 3/1999 | Stewart et al. | |
| 5,900,806 | A | 5/1999 | Issa et al. | |
| 5,914,655 | A | 6/1999 | Clifton et al. | |
| 5,914,667 | A | 6/1999 | Issa et al. | |
| 5,917,405 | A | 6/1999 | Joao | |
| 5,917,410 | A | 6/1999 | Cecic et al. | |
| 5,917,775 | A | 6/1999 | Salisbury | |
| 5,952,933 | A | 9/1999 | Issa et al. | |
| 5,956,424 | A | 9/1999 | Wootton et al. | |
| 5,963,662 | A | 10/1999 | Vachtsevanos et al. | |
| 5,986,543 | A | 11/1999 | Johnson | |
| 5,986,544 | A | 11/1999 | Kaisers et al. | |
| 5,990,786 | A | 11/1999 | Issa et al. | |
| 6,028,522 | A | 2/2000 | Petite | |
| 6,038,289 | A | 3/2000 | Sands | |
| 6,069,655 | A * | 5/2000 | Seeley et al. | 348/154 |
| 6,078,253 | A * | 6/2000 | Fowler | 340/501 |
| 6,081,193 | A | 6/2000 | Trucchi et al. | |
| 6,091,771 | A * | 7/2000 | Seeley et al. | 375/240 |
| 6,094,134 | A | 7/2000 | Cohen | |
| 6,097,429 | A * | 8/2000 | Seeley et al. | 348/154 |
| 6,215,404 | B1 | 4/2001 | Morales | |
| 6,218,953 | B1 | 4/2001 | Petite | |
| 6,236,313 | B1 | 5/2001 | Eskildsen et al. | |
| 6,246,322 | B1 | 6/2001 | LeDain et al. | |
| 6,265,971 | B1 | 7/2001 | Maier, Jr. et al. | |
| 6,269,179 | B1 | 7/2001 | Vachtsevanos et al. | |
| 6,281,789 | B1 | 8/2001 | Furtado et al. | |
| 6,281,790 | B1 | 8/2001 | Kimmel et al. | |
| 6,300,872 | B1 | 10/2001 | Mathias et al. | |
| 6,313,744 | B1 | 11/2001 | Capowski et al. | |
| 6,317,034 | B1 | 11/2001 | Issa et al. | |
| 6,335,976 | B1 | 1/2002 | Belmares | |
| 6,351,214 | B2 | 2/2002 | Eskildsen et al. | |
| 6,363,079 | B1 | 3/2002 | Barzegar et al. | |
| 6,369,705 | B1 | 4/2002 | Kennedy | |
| 6,400,265 | B1 * | 6/2002 | Saylor et al. | 340/531 |
| 6,426,697 | B1 | 7/2002 | Capowski et al. | |
| 6,433,683 | B1 | 8/2002 | Robinson | |
| 6,437,096 | B1 | 8/2002 | Myers et al. | |
| 6,437,692 | B1 | 8/2002 | Petite et al. | |
| 6,459,370 | B1 | 10/2002 | Barrieau et al. | |
| 6,492,905 | B2 | 12/2002 | Mathias et al. | |
| 6,493,687 | B1 | 12/2002 | Wu et al. | |
| 6,504,479 | B1 * | 1/2003 | Lemons et al. | 340/541 |
| 6,507,278 | B1 | 1/2003 | Brunetti et al. | |
| 6,507,790 | B1 | 1/2003 | Radomski | |
| 6,529,723 | B1 | 3/2003 | Bentley | |
| 6,538,570 | B1 | 3/2003 | Smith | |
| 6,538,689 | B1 | 3/2003 | Chang | |
| 6,542,076 | B1 | 4/2003 | Joao | |
| 6,542,077 | B2 | 4/2003 | Joao | |
| 6,549,130 | B1 | 4/2003 | Joao | |
| 6,563,910 | B2 | 5/2003 | Menard et al. | |
| 6,567,001 | B1 | 5/2003 | Barrieau et al. | |
| 6,587,046 | B2 | 7/2003 | Joao | |
| 6,591,094 | B1 | 7/2003 | Bentley | |
| 6,618,074 | B1 | 9/2003 | Seeley et al. | |
| 6,633,640 | B1 | 10/2003 | Cohen et al. | |
| 6,642,954 | B1 | 11/2003 | Parker | |
| 6,658,091 | B1 | 12/2003 | Naidoo et al. | |
| 6,690,411 | B2 | 2/2004 | Naidoo et al. | |
| 6,690,414 | B2 | 2/2004 | Lyons et al. | |
| 6,693,530 | B1 * | 2/2004 | Dowens et al. | 340/506 |
| 6,693,532 | B2 | 2/2004 | Capowski et al. | |
| 6,700,487 | B2 * | 3/2004 | Lyons et al. | 340/541 |
| 6,727,811 | B1 | 4/2004 | Fendis | |
| 6,741,164 | B1 | 5/2004 | Stewart et al. | |
| 6,741,171 | B2 | 5/2004 | Palka et al. | |
| 6,748,343 | B2 | 6/2004 | Alexander et al. | |
| 6,759,954 | B1 * | 7/2004 | Myron et al. | 340/522 |
| 6,778,084 | B2 | 8/2004 | Chang et al. | |
| 6,778,085 | B2 | 8/2004 | Faulkner et al. | |
| 6,798,344 | B2 | 9/2004 | Faulkner et al. | |
| 6,804,513 | B2 * | 10/2004 | Okuya et al. | 455/423 |
| 6,810,244 | B2 | 10/2004 | Bristow et al. | |
| 6,844,818 | B2 | 1/2005 | Grech-Cini | |
| 6,864,789 | B2 | 3/2005 | Wolfe | |
| 6,873,256 | B2 | 3/2005 | Lemelson et al. | |
| 6,888,459 | B2 | 5/2005 | Stilp | |
| 6,890,133 | B2 | 5/2005 | Singh et al. | |
| 6,917,288 | B2 | 7/2005 | Kimmel et al. | |
| 6,930,599 | B2 | 8/2005 | Naidoo et al. | |
| 6,943,682 | B1 | 9/2005 | Dowens et al. | |
| 6,950,021 | B2 | 9/2005 | Butler | |
| 6,954,137 | B2 | 10/2005 | Stewart et al. | |
| 6,954,859 | B1 * | 10/2005 | Simerly et al. | 726/3 |
| 6,970,183 | B1 * | 11/2005 | Monroe | 348/143 |
| 6,972,676 | B1 | 12/2005 | Kimmel et al. | |
| 6,975,220 | B1 | 12/2005 | Foodman et al. | |
| 7,005,971 | B2 | 2/2006 | Stewart et al. | |
| 7,015,806 | B2 | 3/2006 | Naidoo et al. | |
| 7,016,813 | B2 | 3/2006 | Alexander et al. | |
| 7,019,633 | B1 | 3/2006 | Villa et al. | |
| 7,019,639 | B2 | 3/2006 | Stilp | |
| 7,023,341 | B2 * | 4/2006 | Stilp | 340/572.1 |

| | | | | |
|---|---|---|---|---|
| 7,034,677 | B2 | 4/2006 | Steinthal et al. | |
| 7,042,353 | B2 | 5/2006 | Stilp | |
| 7,046,985 | B2 | 5/2006 | Seales et al. | |
| 7,053,764 | B2 | 5/2006 | Stilp | |
| 7,057,512 | B2 | 6/2006 | Stilp | |
| 7,057,764 | B1 | 6/2006 | Sakaue | |
| 7,079,020 | B2 | 7/2006 | Stilp | |
| 7,079,034 | B2 | 7/2006 | Stilp | |
| 7,082,125 | B1 | 7/2006 | Brent et al. | |
| 7,084,756 | B2 | 8/2006 | Stilp | |
| 7,091,827 | B2 | 8/2006 | Stilp | |
| 7,091,832 | B1 | 8/2006 | Butterman et al. | |
| 7,091,847 | B2 | 8/2006 | Capowski et al. | |
| 7,093,241 | B2 | 8/2006 | Hsieh et al. | |
| 7,095,321 | B2 | 8/2006 | Primm et al. | |
| 7,103,152 | B2 | 9/2006 | Naidoo et al. | |
| 7,103,176 | B2 | 9/2006 | Rodriguez et al. | |
| 7,106,193 | B2 | 9/2006 | Kovach | |
| 7,109,861 | B2 | 9/2006 | Rao | |
| 7,119,609 | B2 | 10/2006 | Naidoo et al. | |
| 7,119,658 | B2 | 10/2006 | Stilp | |
| 7,120,232 | B2 | 10/2006 | Naidoo et al. | |
| 7,120,233 | B2 | 10/2006 | Naidoo et al. | |
| 7,126,467 | B2 * | 10/2006 | Albert et al. | 340/521 |
| 7,129,833 | B2 * | 10/2006 | Albert | 340/521 |
| 7,130,383 | B2 | 10/2006 | Naidoo et al. | |
| 7,148,797 | B2 * | 12/2006 | Albert | 340/521 |
| 7,158,026 | B2 | 1/2007 | Feldkamp et al. | |
| 7,202,789 | B1 | 4/2007 | Stilp | |
| 7,203,132 | B2 | 4/2007 | Berger | |
| 7,218,217 | B2 * | 5/2007 | Adonailo et al. | 340/522 |
| 7,221,260 | B2 | 5/2007 | Berezowski et al. | |
| 7,228,429 | B2 | 6/2007 | Monroe | |
| 7,277,010 | B2 | 10/2007 | Joao | |
| 7,283,048 | B2 | 10/2007 | Stilp | |
| 7,283,789 | B2 | 10/2007 | Choi | |
| 7,323,980 | B2 | 1/2008 | Faulkner et al. | |
| 7,391,315 | B2 | 6/2008 | Friar | |
| 7,409,045 | B2 * | 8/2008 | Naidoo et al. | 379/37 |
| 7,411,490 | B2 | 8/2008 | Perkinson et al. | |
| 2001/0050976 | A1 * | 12/2001 | Simon et al. | 379/39 |
| 2002/0005894 | A1 * | 1/2002 | Foodman et al. | 348/143 |
| 2002/0008886 | A1 | 1/2002 | Dausmann et al. | |
| 2002/0024424 | A1 | 2/2002 | Burns et al. | |
| 2002/0027504 | A1 | 3/2002 | Davis et al. | |
| 2002/0040964 | A1 | 4/2002 | Dausmann et al. | |
| 2002/0135491 | A1 | 9/2002 | Maier, Jr. | |
| 2003/0005326 | A1 | 1/2003 | Flemming | |
| 2003/0016130 | A1 | 1/2003 | Joao | |
| 2003/0025599 | A1 | 2/2003 | Monroe | |
| 2003/0062997 | A1 * | 4/2003 | Naidoo et al. | 340/531 |
| 2003/0067541 | A1 | 4/2003 | Joao | |
| 2003/0072634 | A1 | 4/2003 | Powell | |
| 2003/0080865 | A1 | 5/2003 | Capowski et al. | |
| 2003/0104822 | A1 | 6/2003 | Bentley | |
| 2003/0120367 | A1 * | 6/2003 | Chang et al. | 700/94 |
| 2003/0193404 | A1 | 10/2003 | Joao | |
| 2003/0206102 | A1 | 11/2003 | Joao | |
| 2004/0024851 | A1 | 2/2004 | Naidoo et al. | |
| 2004/0032491 | A1 | 2/2004 | Woody et al. | |
| 2004/0036573 | A1 | 2/2004 | Fitzgibbon et al. | |
| 2004/0036596 | A1 | 2/2004 | Heffner et al. | |
| 2004/0041694 | A1 | 3/2004 | Xie | |
| 2004/0041910 | A1 | 3/2004 | Naidoo et al. | |
| 2004/0080401 | A1 | 4/2004 | Stewart et al. | |
| 2004/0081322 | A1 | 4/2004 | Schliep et al. | |
| 2004/0086088 | A1 | 5/2004 | Naidoo et al. | |
| 2004/0086089 | A1 | 5/2004 | Naidoo et al. | |
| 2004/0086090 | A1 | 5/2004 | Naidoo et al. | |
| 2004/0086091 | A1 | 5/2004 | Naidoo et al. | |
| 2004/0086093 | A1 | 5/2004 | Schranz | |
| 2004/0088345 | A1 | 5/2004 | Zellner et al. | |
| 2004/0104811 | A1 | 6/2004 | Stewart et al. | |
| 2004/0135885 | A1 | 7/2004 | Hage | |
| 2004/0145467 | A1 * | 7/2004 | Roby et al. | 340/531 |
| 2004/0145468 | A1 | 7/2004 | La et al. | |
| 2004/0155770 | A1 | 8/2004 | Nelson et al. | |
| 2004/0160319 | A1 | 8/2004 | Joao | |
| 2004/0189460 | A1 | 9/2004 | Heaton et al. | |
| 2004/0201584 | A1 | 10/2004 | Lee | |
| 2004/0204915 | A1 | 10/2004 | Steinthal et al. | |
| 2004/0212493 | A1 * | 10/2004 | Stilp | 340/531 |
| 2004/0212497 | A1 | 10/2004 | Stilp | |
| 2004/0217847 | A1 | 11/2004 | Fries et al. | |
| 2005/0041734 | A1 | 2/2005 | Walker et al. | |
| 2005/0052285 | A1 | 3/2005 | Iriyama | |
| 2005/0068175 | A1 | 3/2005 | Faulkner et al. | |
| 2005/0073411 | A1 | 4/2005 | Butler | |
| 2005/0078672 | A1 | 4/2005 | Caliskan et al. | |
| 2005/0110632 | A1 | 5/2005 | Berezowski et al. | |
| 2005/0110637 | A1 | 5/2005 | Rao | |
| 2005/0128067 | A1 | 6/2005 | Zakrewski | |
| 2005/0134450 | A1 | 6/2005 | Kovach | |
| 2005/0174229 | A1 | 8/2005 | Feldkamp et al. | |
| 2005/0219048 | A1 | 10/2005 | Kimmel et al. | |
| 2005/0225634 | A1 | 10/2005 | Brunetti et al. | |
| 2005/0242945 | A1 * | 11/2005 | Perkinson | 340/531 |
| 2005/0248444 | A1 | 11/2005 | Joao | |
| 2005/0273831 | A1 | 12/2005 | Slomovich et al. | |
| 2005/0275509 | A1 * | 12/2005 | Flick | 340/426.1 |
| 2006/0012478 | A1 | 1/2006 | Carmichel | |
| 2006/0017556 | A1 | 1/2006 | Stewart et al. | |
| 2006/0017558 | A1 | 1/2006 | Albert et al. | |
| 2006/0017559 | A1 | 1/2006 | Albert | |
| 2006/0017561 | A1 | 1/2006 | Albert | |
| 2006/0017579 | A1 | 1/2006 | Albert et al. | |
| 2006/0022816 | A1 | 2/2006 | Yukawa | |
| 2006/0025938 | A1 | 2/2006 | Cottrell | |
| 2006/0028334 | A1 | 2/2006 | Adonailo et al. | |
| 2006/0049934 | A1 | 3/2006 | Breen | |
| 2006/0056386 | A1 | 3/2006 | Stogel | |
| 2006/0072737 | A1 | 4/2006 | Paden et al. | |
| 2006/0087421 | A1 | 4/2006 | Stewart et al. | |
| 2006/0107298 | A1 | 5/2006 | Friar | |
| 2006/0132301 | A1 | 6/2006 | Stilp | |
| 2006/0132302 | A1 | 6/2006 | Stilp | |
| 2006/0132303 | A1 | 6/2006 | Stilp | |
| 2006/0176167 | A1 | 8/2006 | Dohrmann | |
| 2006/0181406 | A1 | 8/2006 | Petite et al. | |
| 2006/0192666 | A1 | 8/2006 | Parker et al. | |
| 2006/0192668 | A1 | 8/2006 | Friar | |
| 2006/0192669 | A1 | 8/2006 | Allen | |
| 2007/0008125 | A1 | 1/2007 | Smith | |
| 2007/0146127 | A1 | 6/2007 | Stilp et al. | |
| 2007/0290842 | A1 | 12/2007 | Barone | |
| 2008/0001734 | A1 | 1/2008 | Stilp et al. | |
| 2008/0036593 | A1 | 2/2008 | Rose-Pehrsson et al. | |
| 2008/0043987 | A1 | 2/2008 | Waalkes et al. | |
| 2008/0048861 | A1 | 2/2008 | Naidoo et al. | |

FOREIGN PATENT DOCUMENTS

| | | |
|---|---|---|
| JP | 6282782 | 10/1994 |
| WO | WO 8700711 | 1/1987 |
| WO | WO 9310621 | 5/1993 |
| WO | WO 9422118 | 9/1994 |
| WO | WO 0075900 | 12/2000 |
| WO | WO 0199075 | 12/2001 |
| WO | WO 02061706 | 8/2002 |
| WO | WO 03065730 | 8/2003 |
| WO | WO2004012163 | 2/2004 |
| WO | WO2006012460 | 2/2006 |

* cited by examiner

SYSTEM AND METHOD FOR MONITORING SECURITY AT A PREMISES

RELATED APPLICATION

This application is based upon prior filed provisional application Ser. No. 60/628,357 filed Nov. 16, 2004, the disclosure which is hereby incorporated in its entirety.

FIELD OF THE INVENTION

This invention relates to alarm systems, and more particularly, this invention relates to alarm systems in which audio is forwarded from an audio sensor to a central monitoring station or server.

BACKGROUND OF THE INVENTION

The assignee of the present invention, Sonitrol Corporation, provides security solutions using audio intrusion detection, access control, video monitoring and fire detection. These security systems allow 24-hour monitoring and are integrated into a single, easy-to-use system that is monitored by highly trained professionals at a central monitoring station. The security system incorporates verified audio detection, which allows a central monitoring station to monitor what is happening at a premises using sound detection.

Small analog audio sensors are strategically placed throughout a premises to allow an operator at the central monitoring station to hear the sounds of abnormal activity in the monitored premises or facility. When the security system is activated, the sounds of the break-in initiates a code that describes the location of the activated analog audio sensor, e.g., a microphone. Audio is transmitted to the central monitoring station. When activation occurs, a skilled operator hears the live audio from the monitored premises while pertinent customer data can be displayed on a computer screen for the operator to review and report.

Monitoring can occur 24 hours a day, 7 days a week. The system can also include devices that permit ID badging with card readers, door contacts to indicate when doors are open at a time when they should not be open, for example, by unauthorized entry, and similar devices. In some systems, video cameras and fire detectors have been included in the overall security system. Audio signals are transmitted as analog signals from the audio sensor, e.g., microphone, through a wired control panel, and over the public switched telephone system to the central monitoring station. The analog system suffers drawbacks and is not always efficient.

SUMMARY OF THE INVENTION

In one non-limiting aspect of the present invention, a security system monitors security at a premises and includes at least one audio sensor located at the premises that receives audio signals and converts the audio signals to digitized audio signals. A central monitoring station is located remote from the premises and receives the digitized audio signals and converts the digitized audio signals into audible audio for an operator that is monitoring the premises. In one non-limiting aspect, the audio sensor includes a processor that is operative for determining whether any digitized audio signals are indicative of an alarm condition and should be received at the central monitoring station. A memory can store digital signatures of different audio sounds indicative of an alarm condition. The processor can be operative for comparing a digitized audio signal with digital signatures stored within the memory.

The audio sensor can also be operative for receiving data relating to audio patterns indicative of false alarms allowing the processor to recognize audio signals indicative of false alarms.

In yet another aspect, a premises controller can be located at the premises such as part of a control panel and operatively connected to each audio sensor for receiving the digitized audio signals and transmitting the digitized audio signals to the central monitoring station. Each audio sensor can include a transceiver for receiving a communications signal from the central monitoring station and transmitting a communications signal to the central monitoring station, such as a signal representing a voice, such as for voice instructions and reply. The central monitoring station can include a server. A client can be in communication with the server for accessing the server and receiving data regarding the security system. The communications network can interconnect the client and server and be formed as an internet or local area network (LAN) or incorporate elements of both. The central monitoring station can also include a first receiver for receiving digitized audio signals generated by the audio sensor and a second receiver for receiving analog signals a security system that does not generate digitized signals because it uses an analog audio sensor. A data bus can interconnect each of the audio sensors and receive the digitized audio signals thereon. Each audio sensor can include an identifying data address on the data bus.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout, and prime notation is used to indicate similar elements in alternative embodiments.

Digitized audio can now be used with sufficient processing capability at the audio sensor, typically a microphone and associated components as explained below. With the system and method as described, franchisees, clients or other customers can operate their own central monitoring station and have the capability to allow a more centralized service to incorporate its monitoring capability. Also, some type of sound analysis at the audio sensor as a microphone or other local device can be provided. Processing can also occur at a premises controller, for example, as part of a control panel, or processing can occur at the remote central monitoring station.

A digital audio sensor as a microphone can include a processor for processing digitized audio signals, a memory for storage, and a transceiver that transmits digitized audio signals across a telephone line, or some other wired communications network or a wireless network to the central monitoring station or server. Separate central monitoring station receivers can receive either analog audio signals from an existing system using analog audio microphones, or digitized audio signals from the audio sensors or both.

The security system as described can monitor security at one or more premises and typically includes at least one premises located audio sensor that converts analog audio signals to digitized audio signals and transmits the digitized audio signals to a central monitoring station at a remote location from the premises. The central monitoring station receives the digitized audio signals and converts the digitized audio signals for playback to an operator that is monitoring the premises. The digital audio sensor can include a processor for recognizing digital signatures of sounds and determine whether any false alarms occur and whether the digitized audio signals should be transmitted to the central monitoring station. A premises controller, for example, as part of a control panel, can be located at the premises and receive any digitized audio signals from one or more audio sensors located at the premises through a data bus in which audio sensors are addressable. The digitized audio signals could be multiplexed for transmission to the central monitoring station or analysis can occur at the premises controller to determine which digitized audio signals should be transmitted or stored.

Figure 1:
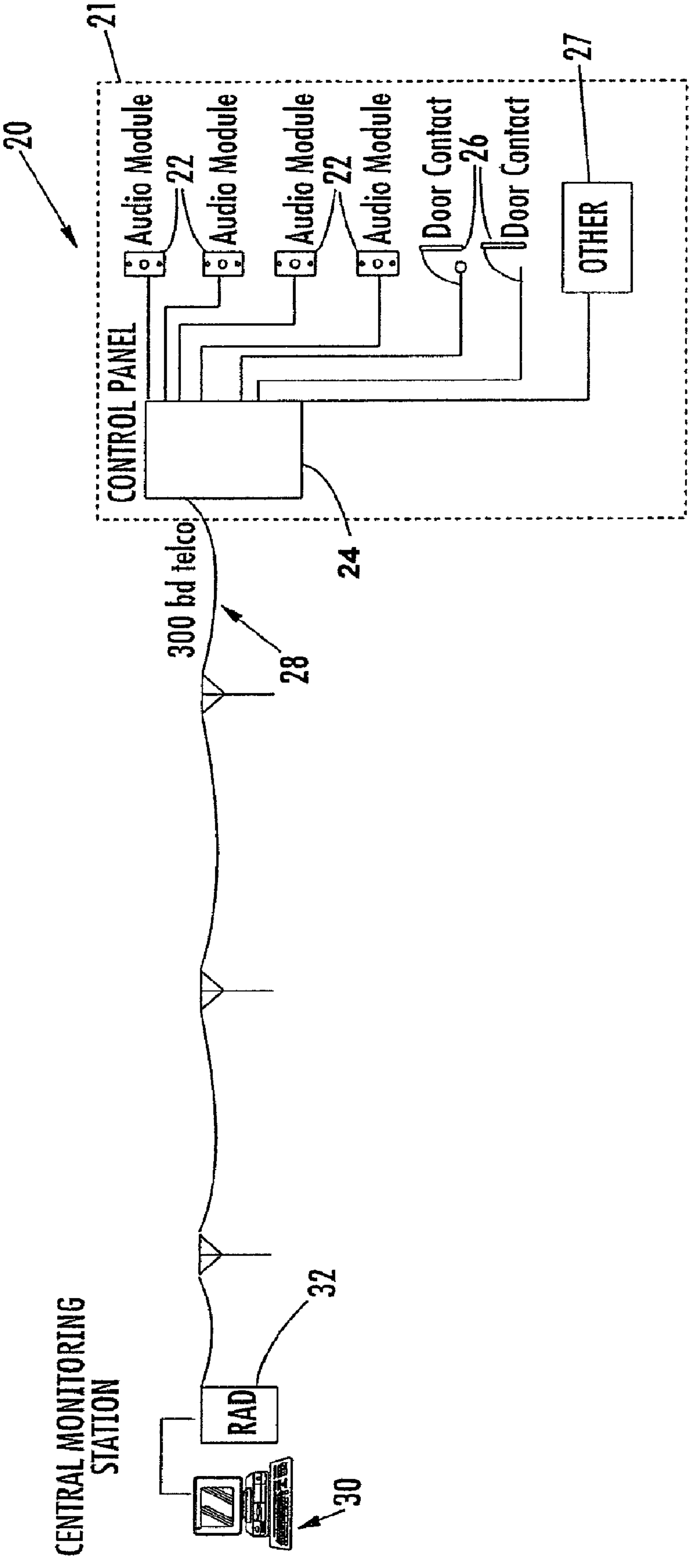
FIG. 1 (PRIOR ART)
FIG. 1 is a fragmentary, block diagram of an existing, prior art security system.

FIG. 1 shows an existing security or alarm system 20 located in a customer premises 21 in which the audio sensors 22 are formed as analog audio modules having microphones and connect into an analog control panel 24. The audio modules 22 are operative as analog microphones and may include a small amplifier. Door contacts 26 can also be used and are wired to the control panel 24. Other devices 27 could include an ID card reader or similar devices wired to the control panel. This section of a customer premises 21, such as a factory, school, home or other premises, includes wiring that connects the analog audio modules 22 direct to the control panel 24 with any appropriate add-ons incorporated into the system. The phone system 28 as a Plain Ordinary Telephone System (POTS) is connected to the control panel 24, and telephone signals are transmitted over a 300 baud industry standard telephone connection as a POTS connection to a remotely located central monitoring station 30 through a Remote Access Device (RAD) 32. The central monitoring station typically includes a computer that requires Underwriter Laboratory (UL) approval. The different accounts that are directed to different premises or groups of alarm devices can be console specific. There is no load leveling in this system.

In this type of existing security system 20, typical operation can occur when a sound crosses a threshold, for example, a volume, intensity or decibel (dB) level, causing the control panel 24 to indicate that there is an intrusion.

A short indicator signal, which could be a digital signal, is sent to the central monitoring station 30 from the control panel 24 to indicate the intrusion. The central monitoring station 30 switches to an audio mode and begins playing the audio heard at the premises 21 through the microphone at the audio sensors or modules 22 to an operator located at the central monitoring station 30. This operator listens for any sounds indicative of an emergency, crime, or other problem. In this existing system, the audio is sent at a 300 baud data rate over regular telephone lines as an analog signal. The 300 baud transmit rate is commonplace in the industry.

In a more complex control panel 24 used in these types of systems, it is possible to add a storage device or other memory that will store about five seconds of audio around the audio event, which could be a trigger for an alarm. The control panel 24 could send a signal back to the central monitoring station 30 of about one-half second to about one second before the event and four seconds after the event. At that time, the security or alarm system 20 can begin streaming live audio from the audio sensors 22. This can be accomplished at the control panel 24 or elsewhere.

The existing security system 20 transmits analog audio signals from the microphone in the audio sensor or module 22 to the control panel 24. This analog audio is transmitted typically over the phone lines via a Plain Old Telephone Service (POTS) line 28 to the central monitoring station 30 having operators that monitor the audio. The central monitoring station 30 could include a number of "listening" stations as computers or other consoles located in one monitoring center. Any computers and consoles are typically Underwriter Laboratory (UL) listed, including any interface devices, for example phone interfaces. Control panels 24 and their lines are typically dedicated to specific computer consoles usually located at the central monitoring station 30. In this security system 20, if a particular computer console is busy, the control panel 24 typically has to wait before transmitting the audio. It is possible to include a digital recorder as a chip that is placed in the control panel 24 to record audio for database storage or other options.

Figure 2:
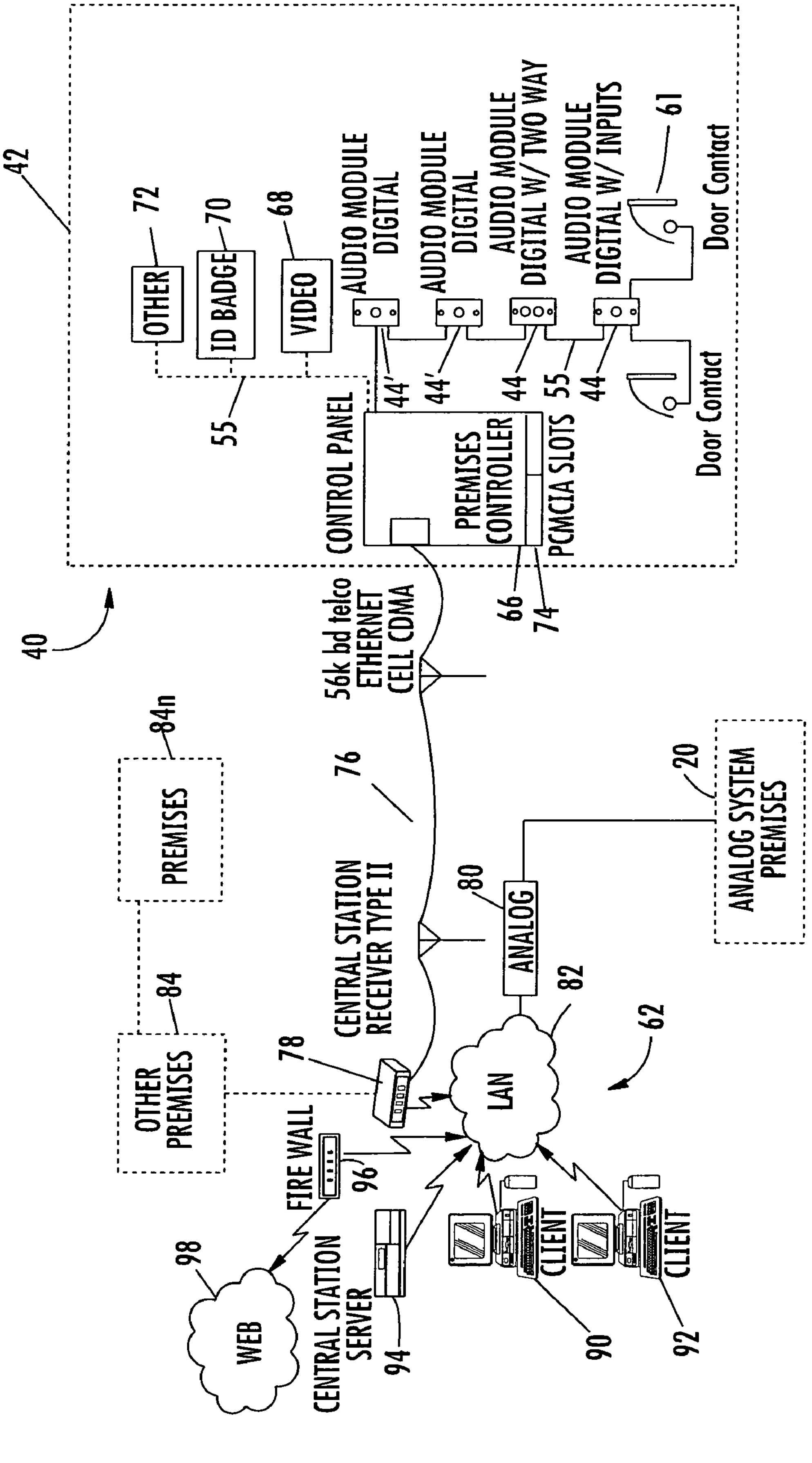
FIG. 2 is fragmentary, block diagram of a first embodiment of the security system of the present invention.

FIG. 2 is a fragmentary block diagram of a security system 40, in accordance with one non-limiting example of the present invention, and at a premises 42 in which a processor, e.g., a microcontroller or other microprocessor, is formed as part of each audio sensor (also referred to as audio module), forming a digital audio module, sensor or microphone 44.

The audio sensor 44 is typically formed as an audio module with components contained within a module housing **44*a* that can be placed at strategic points within the premises 42. Different components include a microphone 46 that receives sounds from the premises. An analog/digital converter 48 receives the analog sound signals and converts them into digital signals that are processed within a processor 50, for example, a standard microcontroller such as manufactured by PIC or other microprocessor. The processor 50 can be operative with a memory 52 that includes a database of audio signatures 52 for comparing various sounds for determining whether any digitized audio signals are indicative of an alarm condition and should be forwarded to the central monitoring station. The memory 52 can store digital signatures of different audio sounds, typically indicative of an alarm condition (or a false alarm) and the processor can be operative for comparing a digitized audio signal with digital signals stored within the memory to determine whether an alarm condition exists. The audio sensor 44 can also receive data relating to audio patterns indicative of false alarms, allowing the processor 50 to recognize audio sounds indicative of false alarms. The processor 50 could receive such data from the central monitoring station through a transceiver 54 that is typically connected to a data bus 55** that extends through the premises into a premises controller as part of a control panel or other component.

The transceiver 54 is also connected into a digital/analog converter 56 that is connected to a speaker 58. It is possible for the transceiver 54 to receive voice commands or instructions from an operator located at the central monitoring station or other client location, which are converted by the processor 50 into analog voice signals. Someone at the premises could hear through the speaker 58 and reply through the microphone. It is also possible for the audio sensor 44 to be formed different such that the microphone could be separate from other internal components.

Figure 2A:
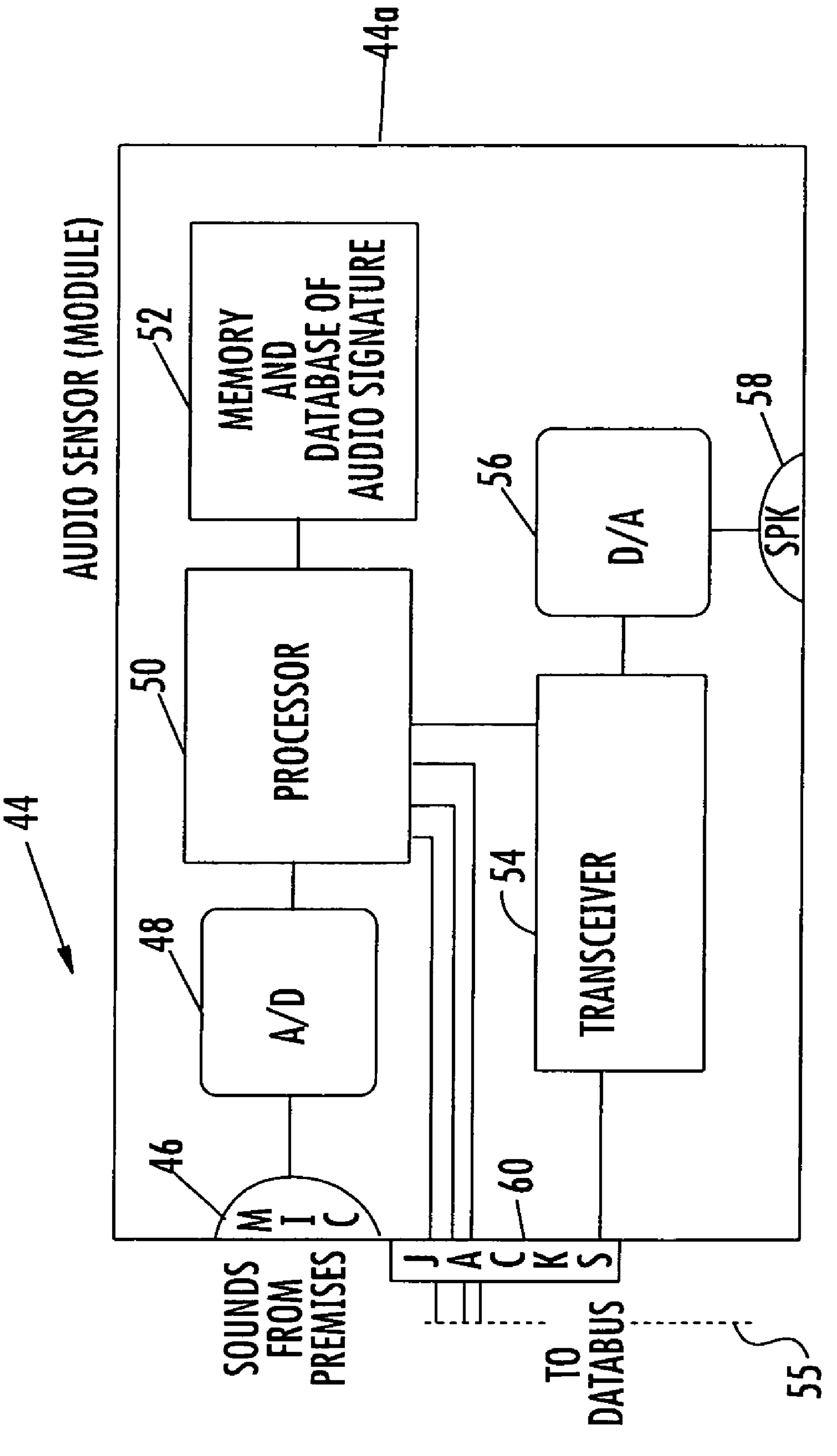
FIG. 2A is a block diagram showing basic high level components of an audio sensor that can be used in the security system shown in FIG. 2 in accordance with one non-limiting example of the present invention.

Although the audio sensor shown in FIG. 2A allows two-way communication, the audio sensor does not have to include such components as shown in FIG. 2, and could be an embodiment for an audio sensor 44' that does not include the transceiver 54, digital/analog converter 56, and speaker 58. This device would be a more simple audio sensor. Also, some digital audio sensors 44 could include a jack 60 that allows other devices to connect into the data bus 55 through the audio sensors and allow other devices such as a door contact 62 to connect and allow any signals to be transmitted along the data bus.

Door contacts 61 and other devices can be connected into an audio sensor as a module. The audio sensor 44 could include the appropriate inputs as part of a jack 60 for use with auxiliary devices along a single data bus 55. Some audio modules 44 can include circuitry, for example, the transceiver 54 as explained above, permitting two-way communications and allowing an operator at a central monitoring station 62 or other location to communicate back to an individual located at the premises 42, for example, for determining false alarms or receiving passwords or maintenance testing. The system typically includes an open wiring topology with digital audio and advanced noise cancellation allowing a cost reduction as compared to prior art systems, such as shown in FIG. 1. Instead of wiring each audio sensor as a microphone back to the control panel as in the system shown in FIG. 1, the audio sensors are typically positioned on the addressable data bus 55, allowing each audio sensor and other device, such as door contacts, card readers or keyed entries to be addressable with a specific address.

It is possible to encode the audio at the digital audio sensor 44 and send the digitized audio signal to a premises controller 66 as part of a control panel in one non-limiting example, which can operate as a communications hub receiving signals from the data bus 55 rather than being operative as a wired audio control panel, such as in the prior art system shown in FIG. 1. Thus, audio can be digitized at the audio sensor 44, substantially eliminating electrical noise that can occur from the wiring at the audio sensor to the premises controller 66. Any noise that occurs within the phone system is also substantially eliminated from the premises controller 66 to the central monitoring station 62. As shown in FIG. 2, a video camera 68, badge or ID card reader 70 and other devices 72 as typical with a security system could be connected into the data bus 55 and located within the premises 42.

One problem that occurs in current phone systems is the use of digital phone devices that multiplex numerous signals and perform other functions in transmission. As a result, a "pure" audio signal in analog prior art security systems, such as shown in FIG. 1, was not sent to the central monitoring station 30 along the contemporary phone network 28 when the 300 baud analog audio system was used. Some of the information was lost. In the system shown in FIG. 2, on the other hand, because digitization of the audio signal typically occurs at the audio sensor 44, more exact data is forwarded to the central monitoring station 62, and as a result, the audio heard at the central monitoring station is a better representation of the audio received at the microphone 46.

As shown in FIG. 2, the premises controller 66 can be part of a central panel, and can include PCMCIA slots 74. In another example, the premises controller 66 can be a stand-alone unit, for example, a processor, and not part of a control panel. In this non-limiting illustrated example, two PCMCIA slots 74 can be incorporated, but any number of slots and devices can be incorporated into a control panel for part of the premises controller 66. The slots can receive contemporary PC cards, modems, or other devices. The PCMCIA devices could transmit audio data at 56K modem speed across telephone lines, at higher Ethernet speeds across a data network, at a fast broadband, or wireless, for example, cellular CDMA systems. A communications network 76 extends between the premises controller 66 and the central monitoring station 62 and could be a wired or wireless communications network or a PSTN. The PCMCIA slots 74 could receive cellular or similar wireless transmitter devices to transmit data over a wireless network to the central monitoring station 62. As illustrated, a receiver 78 is located at the central monitoring station 62, and in this non-limiting example, is designated a central station receiver type II in FIG. 2, and receives the digitized audio signals. A receiver 80 for analog audio signals from a control panel in the system 20 of FIG. 1 could be designated a central station receiver type I, and both receivers output digitized audio signals to a local area network 82. Other premises 84 having digital audio sensors 44 as explained above could be connected to receiver 78, such that a plurality of premises could be connected and digital audio data from various premises 84-84*n* for "n" number of premises being monitored.

It is also possible to separate any receivers at the central monitoring station 62 away from any computer consoles used for monitoring a premises. A portion of the product required to be Underwriter Laboratory (UL) approved could possibly be the central station receiver 78. Any computer consoles as part of the central monitoring station could be connected to the local area network (LAN) 82. A central station server 94 could be operative through the LAN 82, as well as any auxiliary equipment. Because the system is digital, load sharing and data redirecting could be provided to allow any monitoring console or clients 90,92 to operate through the local area network 82, while the central station server 94 allows a client/server relationship. A database at the central station server 94 can share appropriate data and other information regarding customers and premises. This server based environment can allow greater control and use of different software applications, increased database functions and enhanced application programming. A firewall 96 can be connected between the local area network 82 and an internet/worldwide web 98, allowing others to access the system through the web 98 and LAN 82 if they pass appropriate security.

Figure 3:
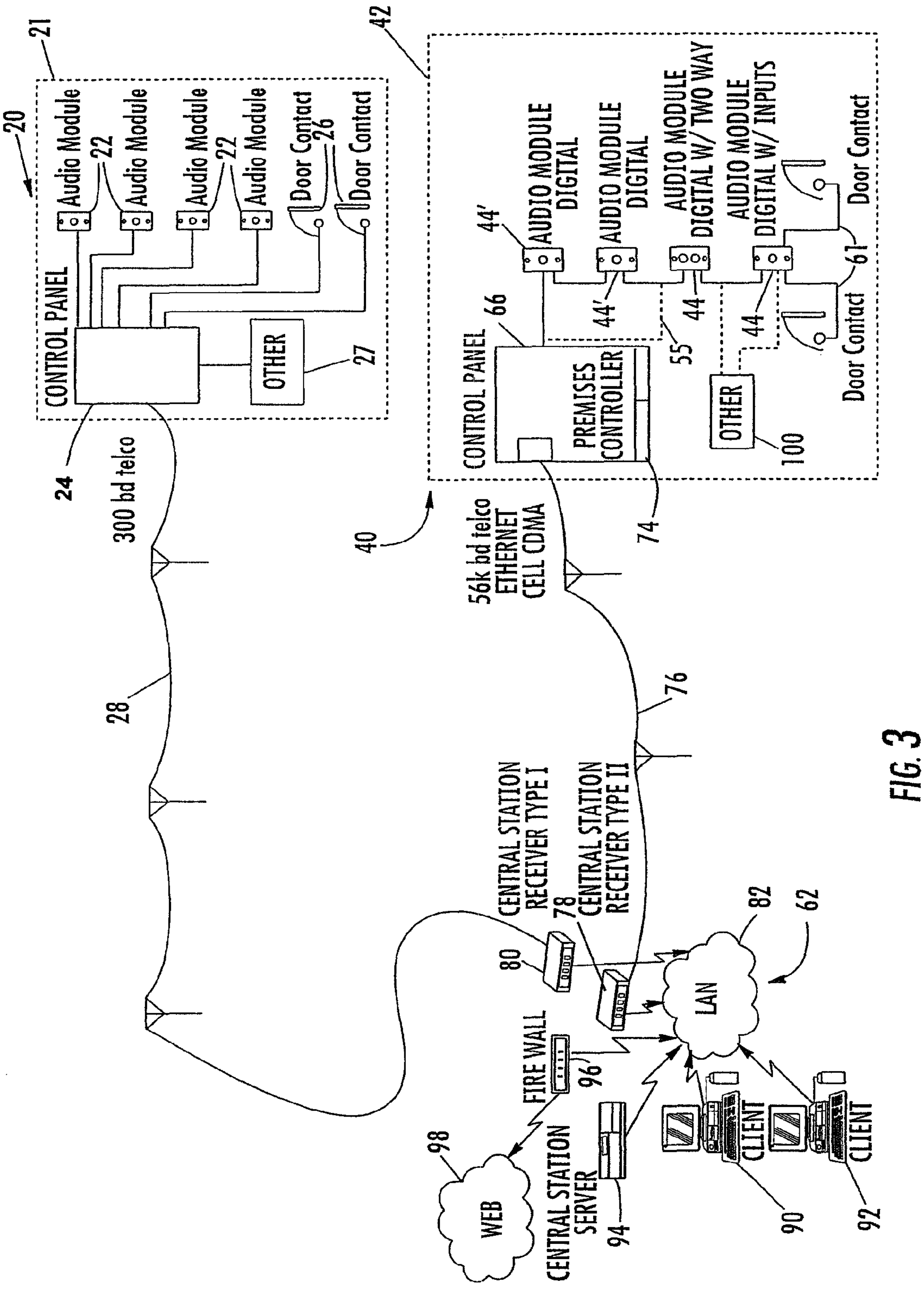
FIG. 3 is a fragmentary, block diagram of another embodiment of a security system of the present invention.

FIG. 3 is another view similar to FIG. 2, but showing a service to an installed customer base of a security system 80 with existing accounts, replacing some of the central monitoring station equipment for digital operation. The analog security system 20 is located at premises 21 and includes the typical components as shown in FIG. 1, which connect through the PSTN 28 to a central station receiver type 180 for analog processing. Other devices 100 are shown with the digital security system 40 at premises 42. For existing security systems 20 that are analog based, the central station receiver type 180 is operative with any existing and installed equipment in which analog signals are received from the analog audio modules 22, door contacts 26 or other devices 27, and transmitted through the control panel 26 at 300 baud rate over the telephone line 28. The system at premises 42, on the other hand, digitizes the analog sound picked up by audio sensors 44 transmits the digitized data into the central monitoring station 62 and into its local area network 82 via the premises controller 74. Data processing can occur at the premises controller 74, which is digitized and operative with the digital audio sensors 44.

At a central monitoring station 62, an operator typically sits at an operator console. The audio is received as digitized data from the digital audio sensors 44 and received at the central station receiver type II 78. Other analog signals from the analog audio modules 22, control panel 26 and telephone line 28 are received in a central station receiver type 180. All data has been digitized when it enters the local area network (LAN) 82 and is processed at client consoles 90,92. The clients could include any number of different or selected operators. Load sharing is possible, of course, in such a system, as performed by the central station server 94, such that a console typically used by one client could be used by another client to aid in load balancing.

Figure 4:
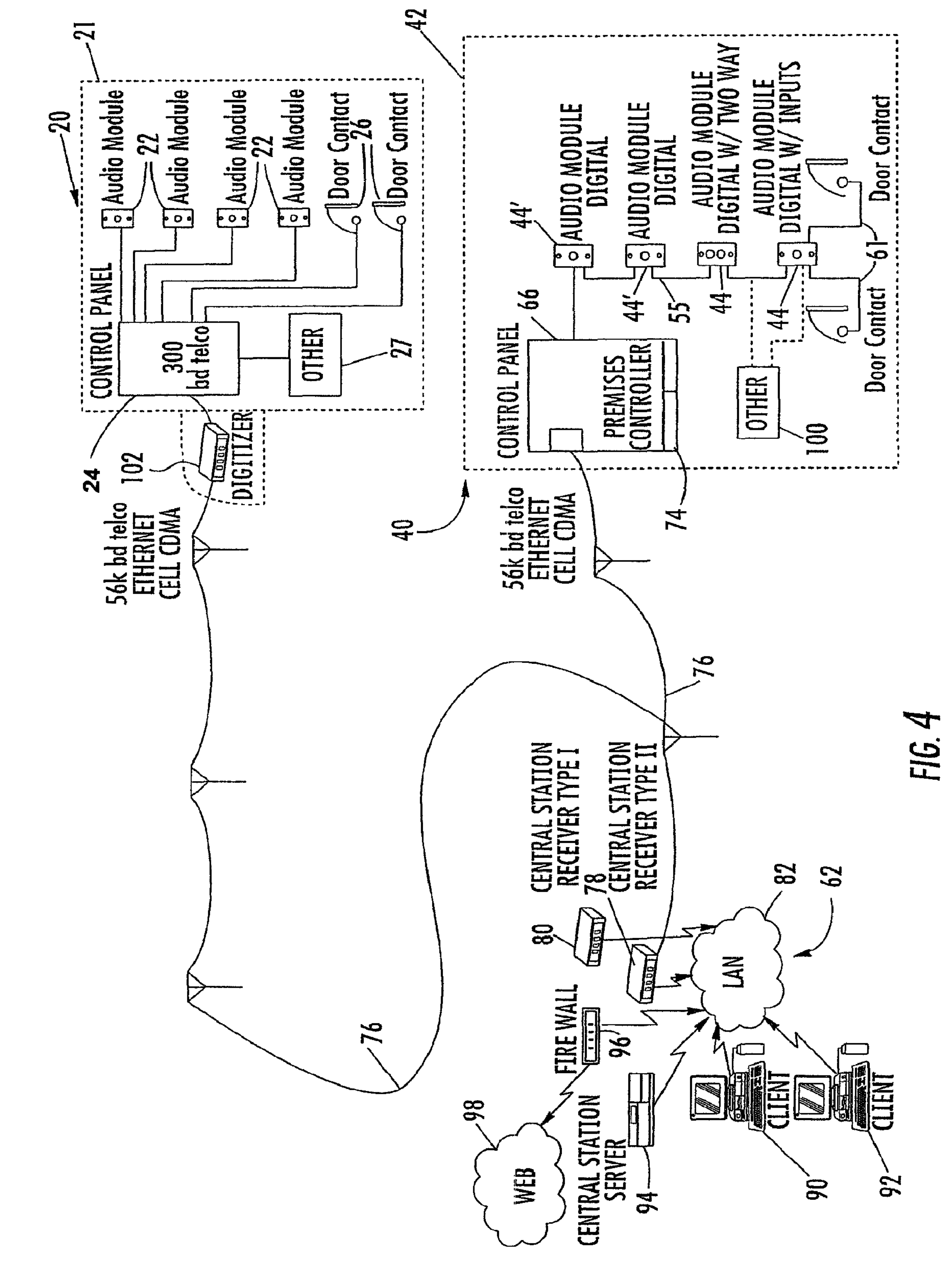
FIG. 4 is a fragmentary, block diagram of another embodiment of a security system of the present invention.

FIG. 4 shows the type of service that can be used for remote accounts when a phone problem exist at a premises 20, or along a telephone line in which it would be difficult to pass an analog audio signal at 300 baud rate from the control panel 26. A digitizer 102 is illustrated as operative with the control panel 26 and provides a remedy for the analog signals emanating from the control panel over a standard telephone line to the central monitoring station 62, when the signals cannot be received in an intelligible manner. The digitizer 102 digitizes the analog audio signal using appropriate analog-to-digital conversion circuitry and transmits it at a higher data rate, for example at a 56K baud rate to the central monitoring station 62. In other embodiments, the digitizer could transmit over an Ethernet network connection, or over a wireless CDMA cellular phone signal to the central monitoring station 62. The signal is received in a central station receiver type II 78, which is operative to receive the digital signals. This improved system using the digitizer 102 in conjunction with a more conventional system could be used in the rare instance when there is poor service over existing telephone lines. The digitizer 102 could be part of the control panel 26 within the premises or located outside the premises and connected to a telephone line.

Figure 5:
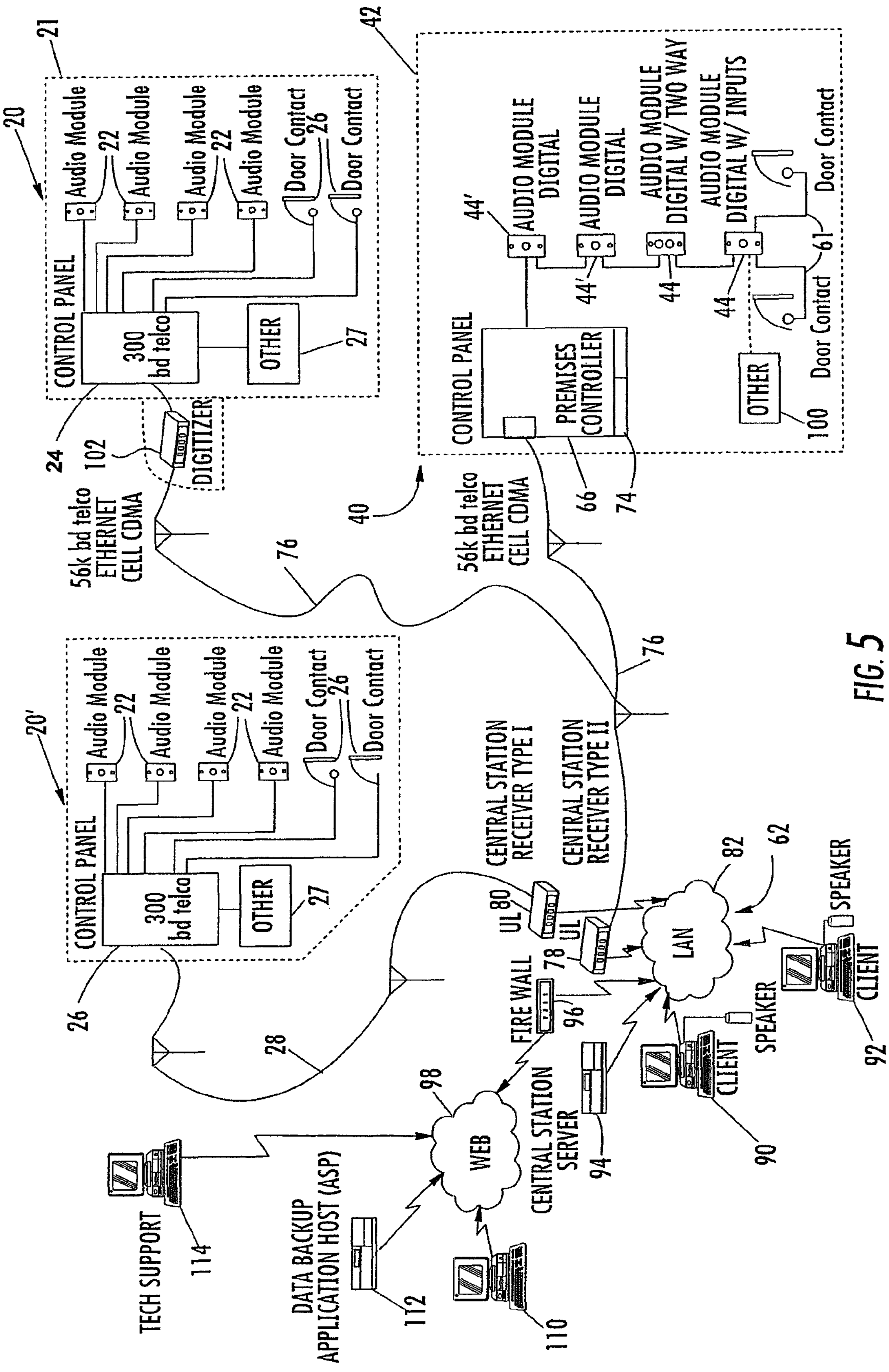
FIG. 5 is a fragmentary, block diagram of another embodiment of a security system of the present invention.

FIG. 5 shows different security systems 20, 20' and 40 in which legacy accounts using the analog audio modules 22 have been provided for through either the digitizer 102 that transmits signals to the central station receiver type II 78 or the use of the central station receiver type 180, which receives the analog signals, such as from the security system 20'. Other individuals can connect to the central monitoring station 62 through the internet, i.e., worldwide web 98 as illustrated. For example, a remote client 110 could connect to the central station server 94 through the web 98, allowing access even from a home residence in some cases. Data back-up could also be provided at a server 112 or other database that could include an application service provider (ASP) as an application host and operative as a web-based product to allow clients to obtain services and account information. Technical support 114 could be provided by another client or operator that connects through the web 98 into the system at the central monitoring station 62 to determine basic aspects and allow problem solving at different security systems. Because each audio sensor 44 is addressable on the data bus 55, it is possible to troubleshoot individual audio sensors 44 from a remote location, such as the illustrated clients 90, 92, 110 or technical support 114.

Problem accounts are also accounted for and software services provide greater client control, for example, for account information, including a client/server application at the application host 112, which can be a web-based product. Customers can access their accounts to determine security issues through use of the worldwide web/internet 98. Data can pass through the firewall 96 into the local area network 82 at the central monitoring station 62 and a customer or local administrator for a franchisee or other similarly situated individual can access the central station server 94 and access account information. It is also possible to have data back-up at the application host (ASP) 112 in cooperation with a client application operated by a system operator. Outside technical support 114 can access the central monitoring station 62 local area network 82 through the internet 98, through the firewall 96, and into the local area network 82 and access the central station server 94 or other clients 90,92 on the local area network. Technical support can also access equipment for maintenance. The system as described relative to FIG. 5 can also allow account activation through the application host 112 or other means.

Figure 6:
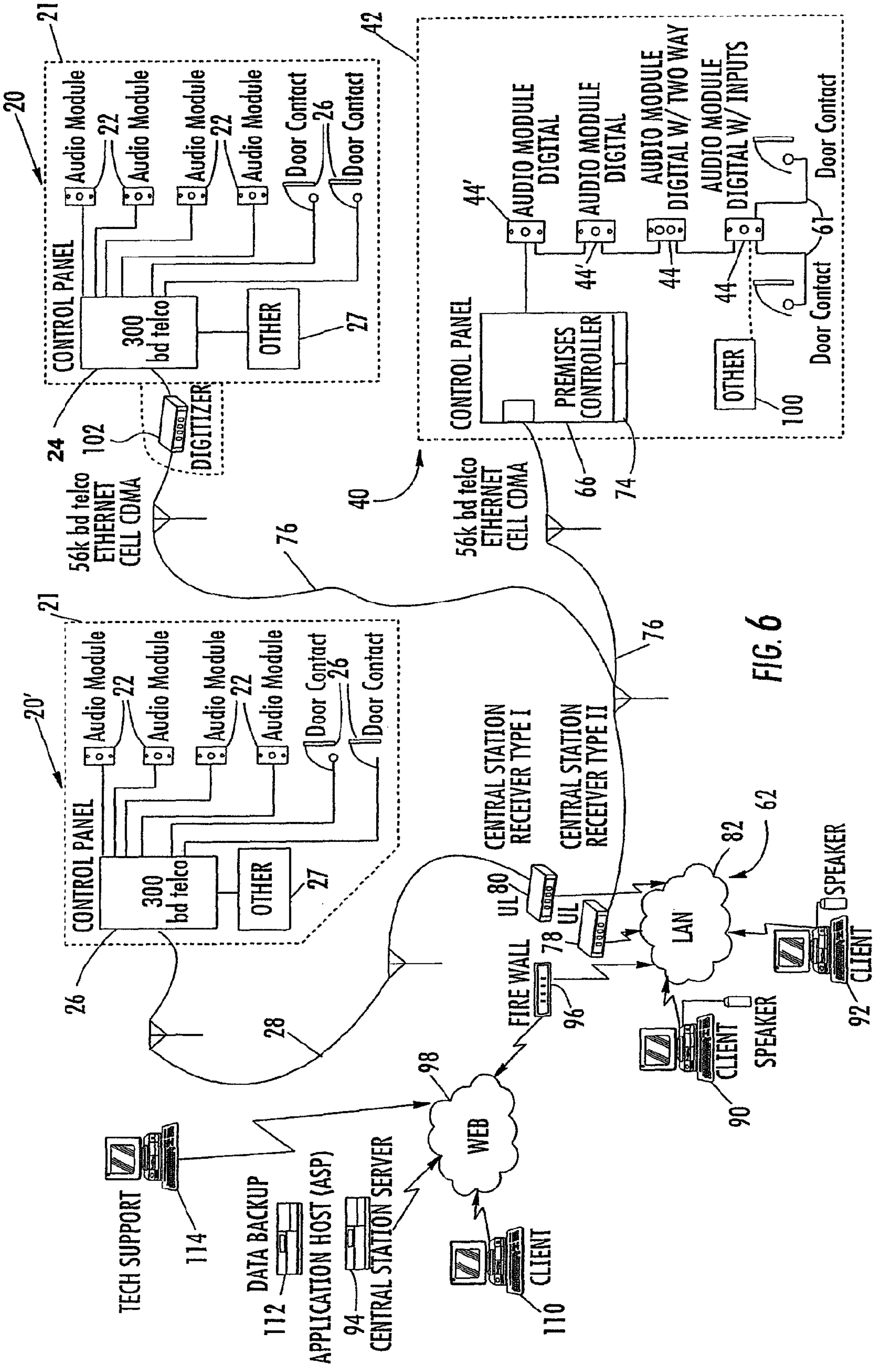
FIG. 6 is a fragmentary, block diagram of another embodiment of a security system of the present invention.

FIG. 6 shows a system with a different business model in which the central station server 94 is remote with the database and application host (ASP) 112 and accessed through the internet/web 98. The central station server 94 in this non-limiting example is connected to the internet 98 and different numbers of servers 94 could be connected to the internet to form a plurality of central monitoring stations, which can connect to different client monitoring consoles (with speakers for audio). Different client monitoring consoles could be owned by different customers, for example, dealers or franchisees. A corporate parent or franchiser can provide services and maintain software with updates 24/7 in an IP environment. Franchisees, customers or dealers could pay a service fee and access a corporate database.

Figure 7:
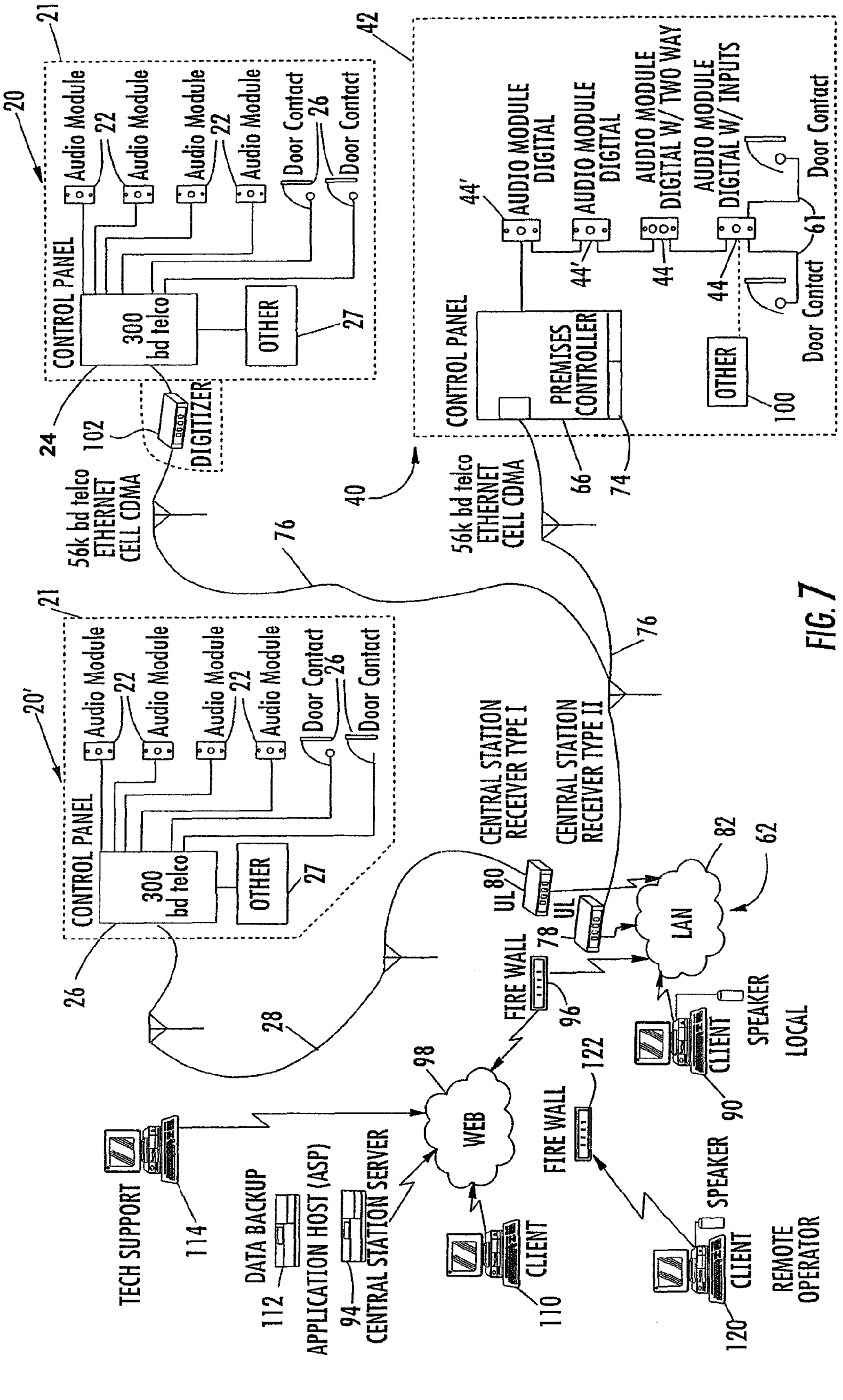
FIG. 7 is a fragmentary, block diagram of another embodiment of a security system of the present invention.

FIG. 7 shows that the system of the present invention has the ability to monitor at a remote location, load share, late shift or back-up. A remote operator 120 as a client, for example, can connect through the internet 98 to the local area network 82. As illustrated, the remote client 120 is connected to the internet 98 via a firewall 122. Both clients 110,120 connect to the web 98 and to the central monitoring station 82 via the firewall 96 and LAN 82. At the central monitoring station 62, if an operator does not show for work, load sharing can be accomplished and some of the balance of duties assumed by the clients 110,120. Also, it is possible to monitor a client system for a fee. This could be applicable in disasters when a local monitoring station as a monitoring center goes down. Naturally, a number of local monitoring stations as monitoring centers could be owned by franchisees or run by customers/clients.

Figure 8:
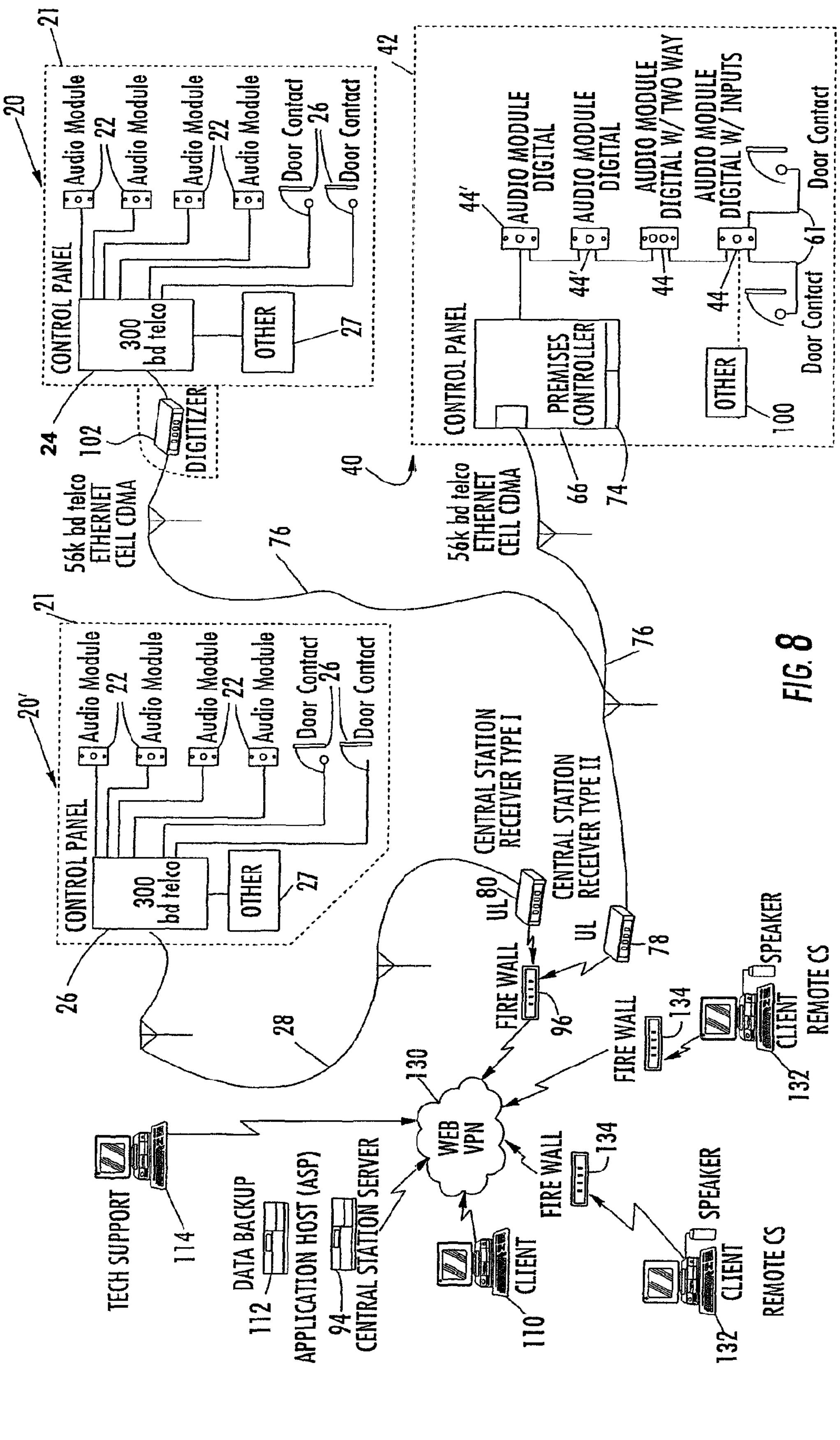
FIG. 8 is a fragmentary, block diagram of another embodiment of a security system of the present invention.

There may also be central monitoring stations owned or operated by a franchisee, which does not desire to monitor its site. It is possible to have monitoring stations in secure locations, or allow expansion for a smaller operator. With a web-based, broadband based station, it is possible to monitor smaller operators and/or customers, franchisees, or other clients and also locate a central monitoring station in a local region and do monitoring at other sites. It is also possible to use a virtual private network (VPN) 130, as illustrated in FIG. 8. Central monitoring station receiving equipment 132 as servers or computers could be remotely located for functioning as a central monitoring station (CS), which can be placed anywhere. For example, when a local control panel (premises controller) 66 activates, the system could call an 800 number or a local number and send data to the more local monitoring location where a central monitoring station 132 exists. Thus, it is possible to place a central monitoring station in the locality or city where the account is located and use the internet move data. This allows local phone service activation and reduces telephone infrastructure costs. It should be understood that the virtual private network 130 is not a weak link in the system and is operable to move data at high speeds. Appropriate firewalls 134 could be used.

Figure 9:
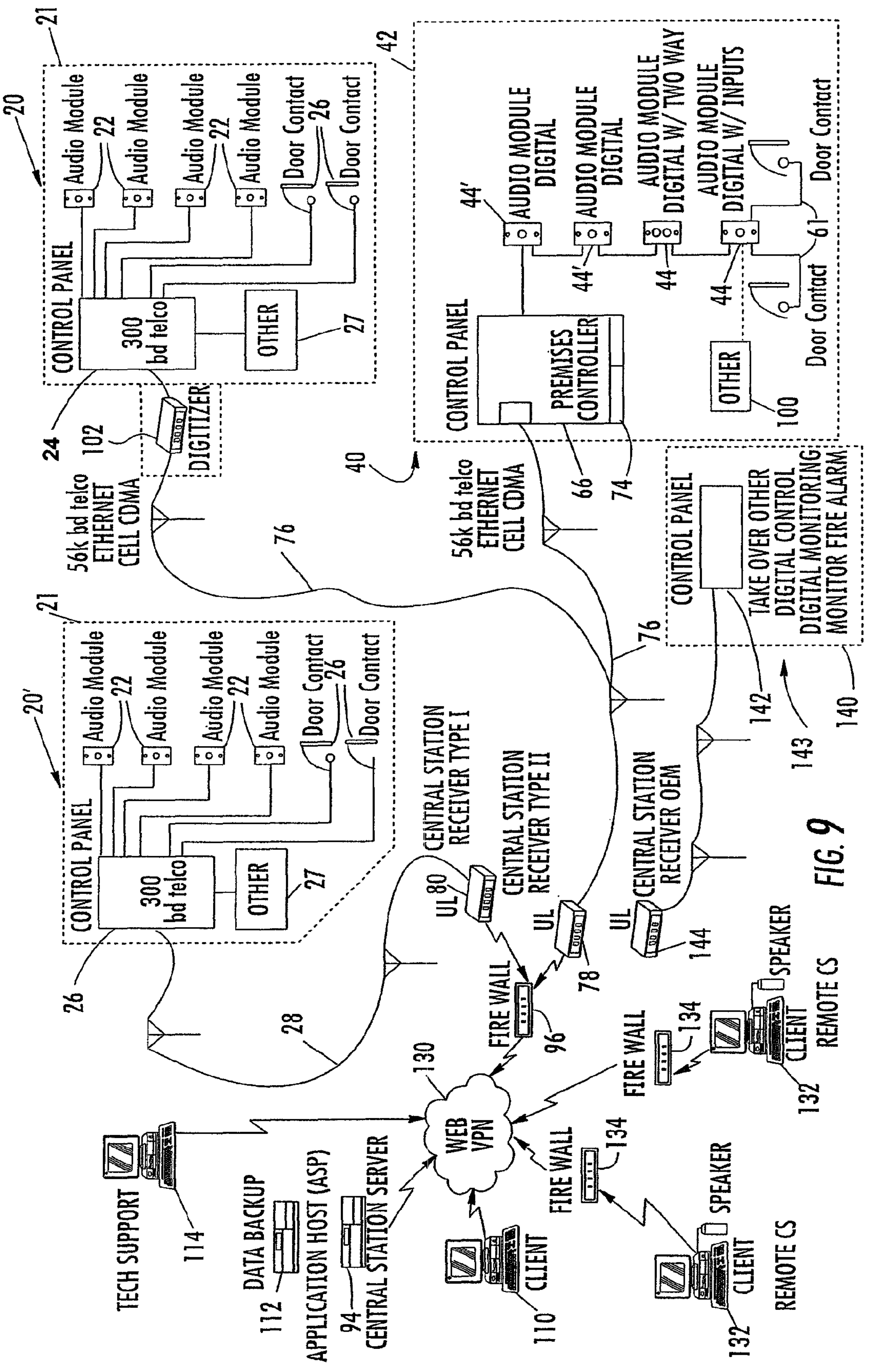
FIG. 9 is a fragmentary, block diagram of another embodiment of a security system of the present invention.

FIG. 9 shows that remote monitoring in the security system can be accomplished with any type of account, as shown by the premises at 140, which includes a control panel as a premises controller 142 for monitoring a security system 143 having a design different from the design of other security systems as described above. There could be some original equipment manufacturer accounts, for example, users of equipment manufactured by Tyco Electronics, Radionics Corporation or other equipment and device providers. It is possible in the security system to monitor control equipment provided by different manufacturers. This monitoring could be transparent to the central monitoring stations through an OEM central monitoring station receiver 144. It is possible with an appropriate use of software and an applicable receiver at the central monitoring station that any alarm system of a manufacturer could be monitored. This can be operative with the control panel as a premises controller, which can receive information from other digital security alarms. A central monitoring station receiver could be Underwriter Laboratory approved and operative as a central monitoring station receiver 144 for an original equipment manufacturer (OEM).

Figure 10:
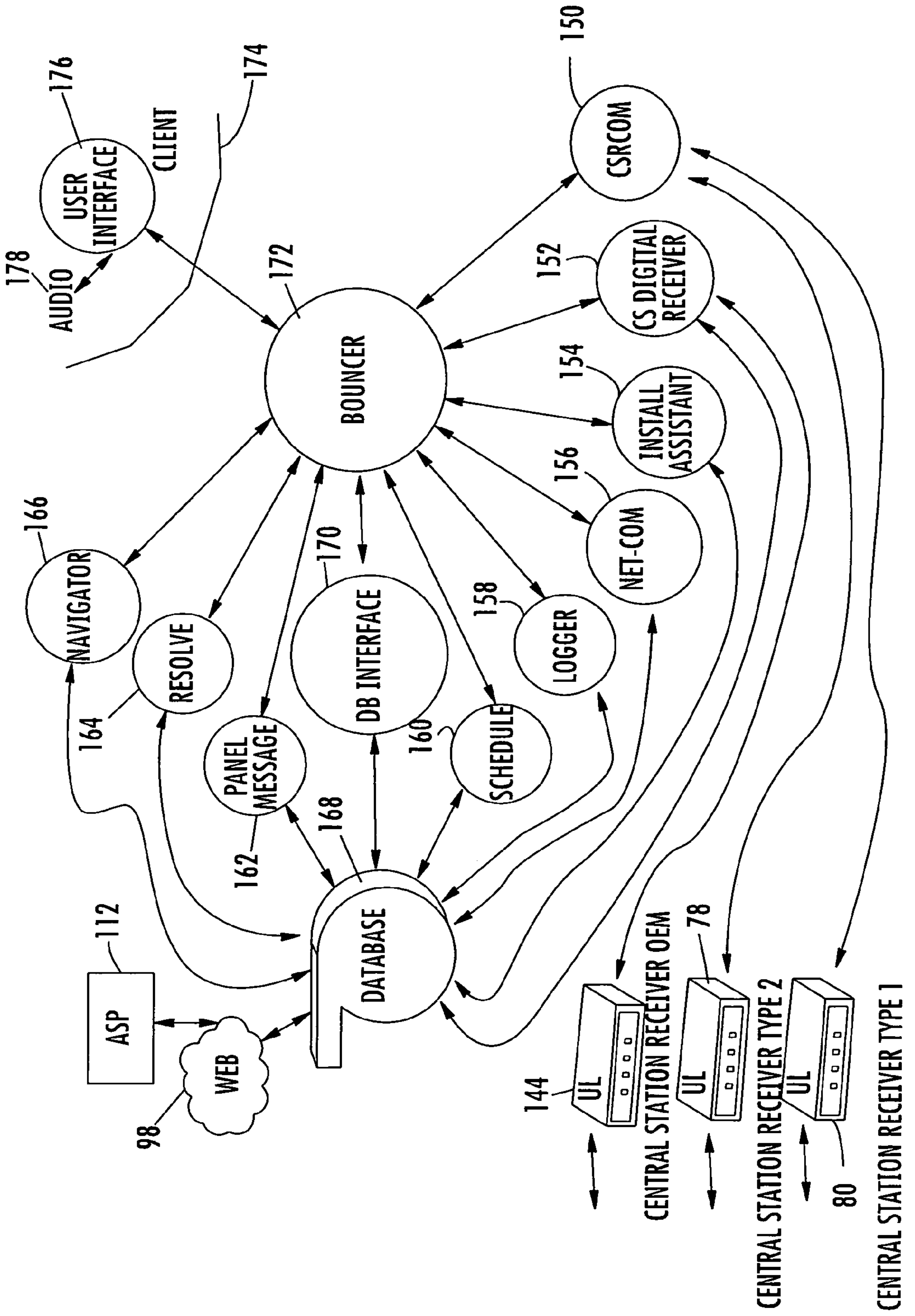
FIG. 10 is a logic diagram showing an example of the different software modules that can be used in the software architecture for the present invention.

FIG. 10 is a logic diagram showing an example of software modules that could be used for the security system of the present invention. A central station receiver type 180, central station receiver type II 78, and central station receiver OEM 144 are operative with respective central station receiver communications module 150 and central station digital receiver communications module 152. Other modules include an install assistance module 154 to aid in installing any software, a net communications module 156 that is operative to allow network communications, and a logger module 158 that is operable for logging data and transactions. A schedule module 160 is operable for scheduling different system aspects, and a panel message module 162 is operative for providing panel messages. Other modules include the resolve module 164 and navigator module 166. A database 168 is operative with a database interface 170, and a bouncer program 172 is also operable with the client 174 that includes a user interface 176 and audio 178. The database 168 can be accessed through the web 98 using the ASP 112 or other modules and devices as explained above. The bouncer 172 could be operative as a proxy and also act to "bounce" connections from one machine to another.

Figure 11:
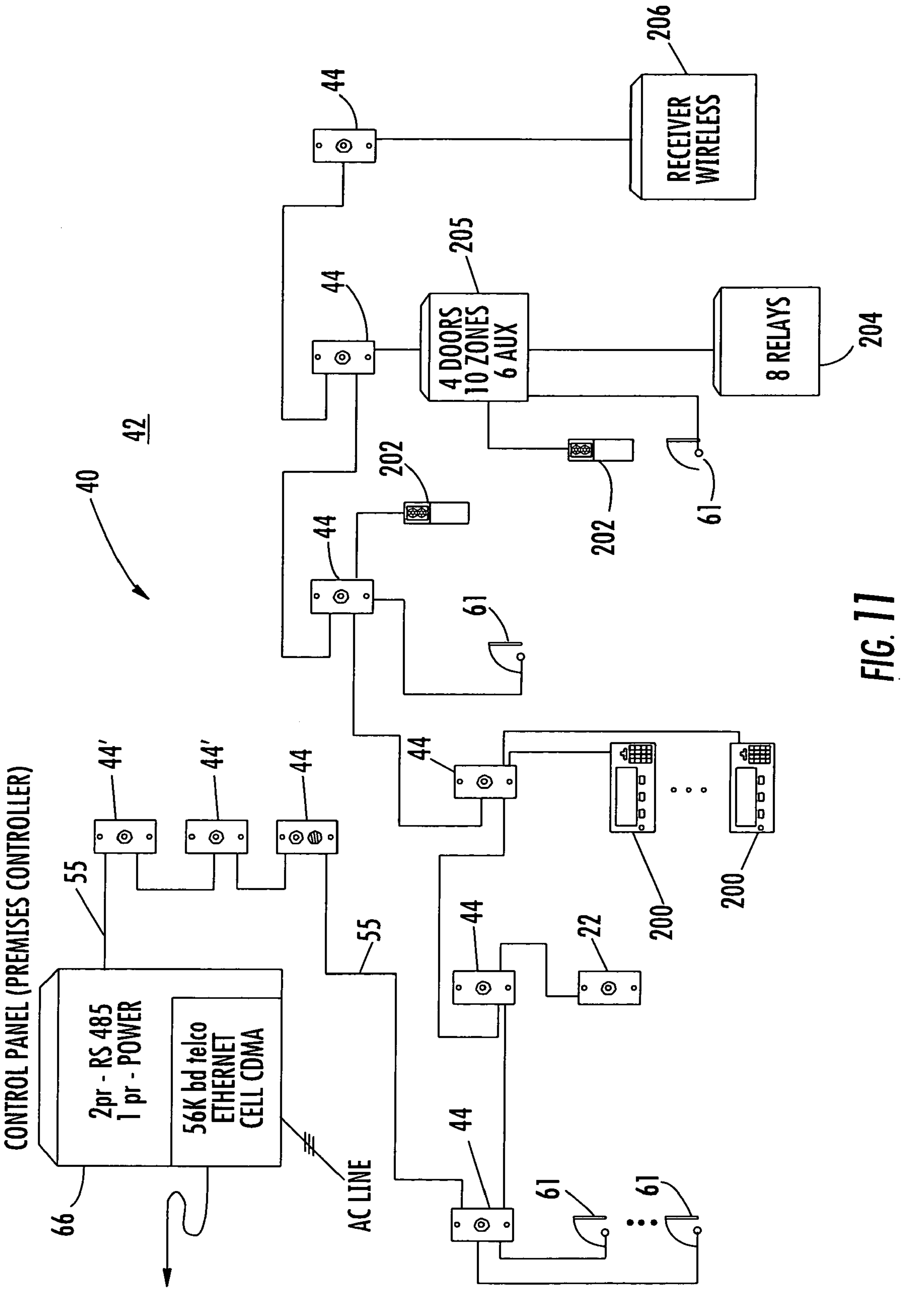
FIG. 11 is a block diagram showing an example of the type of devices that can be used as an example in the system of the present invention.

FIG. 11 shows different types of field equipment that can be used with a security system 40 in accordance with one non-limiting example of the present invention. As illustrated, field equipment for a monitored premises 42 is illustrated as connected on one data bus 55. The equipment includes audio sensors 44', door contacts 61, keypads 200 and card readers 202, which can connect on one bus 55 through other sensors 44. Some third party systems could be used, and relays 204 for zones 205 and wireless receivers 206 could be connected.

It should be understood that some pattern recognition can be done at the audio sensor 44 as a microphone with appropriate processing capability. For example, if common noises exceed a certain threshold, or if a telephone rings, in the prior art system using analog audio sensors 22 such as shown in FIG. 1, the noise could trip the audio. For example, a telephone could ring and the audio would trip any equipment central monitoring station, indicating an alarm. The operator would listen to the audio and conclude that a phone had rung and have to reset the system.

In the security system of the present invention, there is sufficient processing power at the audio sensor 44 with associated artificial intelligence (AI) to learn that the telephone is a nuisance as it recognizes when the phone rings and does not bother to transmit a signal back to the central monitoring station via the premises controller.

There are a number of non-limiting examples of different approaches that could be used. For example, intrusion noise characteristics that are volume based or have certain frequency components for a certain duration and amplitude could be used. It is also possible to establish a learning algorithm such that when an operator at a central monitoring station 62 has determined if a telephone has rung, and resets a panel, an indication can be sent back to the digital audio sensor 44 that an invalid alarm has occurred. The processor 56 within the digital audio sensor 44 can process and store selected segments of that audio pattern, for example, certain frequency elements, similar to a fingerprint voice pattern. After a number of invalid alarms, which could be 5, 10 or 15 depending on selected processing and pattern determination, a built-in pattern recognition occurs at the audio sensor. A phone could ring in the future and the audio sensor 44 would not transmit an alarm.

Any software and artificial intelligence could be broken into different segments. For example, some of the artificial intelligence can be accomplished at the digital audio sensor 44, which includes the internal processing capability through the processor 50 (FIG. 2). Some software and artificial intelligence processing could occur at the control panel as the premises controller 66. For example, the digital audio sensor 44 could send a specific pattern back to the premises controller 66 or central monitoring station 62. In one scenario, lightning occurs with thunder, and every audio sensor 44 in many different premises as monitored locations could initiate an alarm signal as the thunder cracks. In a worse case scenario, a central monitoring station 62 would have to monitor, for example, 500 alarms simultaneously. These alarms must be cleared. Any burglar who desired to burglarize a premises would find this to be an opportune time to burglarize the monitored premises because the operator at a central monitoring station 62 would be busy clearing out the security system and would not recognize that an intruder had entered the premises.

In another non-limiting example of the present invention, an algorithm operable within the processor of the premises controller 66 can determine when all audio sensors 44 went off, and based on a characteristic or common signal between most audio sensors, determine that a lightning strike and thunder has occurred. It is also possible to incorporate an AM receiver or similar reception circuitry at the premises controller 66 as part of the control panel, which receives radio waves or other signals, indicative of lightning. Based upon receipt of these signals and that different audio sensors 44 generated signals, the system can determine that the nuisance noise was created by lightning and thunder, and not transmit alarm signals to the central monitoring station 62. This could eliminate a logjam at the central monitoring station and allow intrusion to be caught at the more local level.

The field equipment shown in FIG. 11 indicates that digital audio sensors 44 digitize the audio at the audio sensor and can perform pattern recognition on-board. Audio can also be stored at the audio sensor using any memory 52 (FIG. 2). Audio can also be streamed after an alarm signals. As illustrated, different devices are situated on one data bus and can interface to other devices to simplify wiring demands. These devices could be programmed and flash-updateable from the premises controller 66 or the event more remotely. There can also be different zones and relays.

The digital audio sensor 44 could include different types of microprocessors or other processors depending on what functions the digital audio sensor is to perform. Each audio sensor typically would be addressable on the data bus 55. Thus, an audio sensor location can be known at all times and software can be established that associates an audio sensor location with an alarm. It is also possible to interface a video camera 68 into the alarm system. When the system determines which audio sensor has signaled an alarm and audio has begun streaming, the digital signal could indicate at the premises controller 66 if there is an associated camera and whether the camera should be activated and video begin from that camera.

As indicated in FIG. 11, door contacts 62 could be connected to the digital audio sensor 44, enhancing overall security processing and wiring efficiency. Some rooms at a premises could have more than two audio sensors, for example, a digital audio sensor with the microprocessor, and another auxiliary sensor as a microphone 22, which could be analog. The signal from this microphone 22 could be converted by the digital audio sensor 44. Keypads 200 and keyless entries 202 could be connected to the digital audio sensor to allow a digital keypad input. There could also be different auxiliary inputs, including an audio sensor that receives analog information and inputs it into the digital audio sensor, which processes the audio with its analog-to-digital converter. Door contacts 62 can include auxiliary equipment and be connected into the digital audio sensor. The security system could include different relays 204 and zones 205 and auxiliary devices as illustrated. A wireless receiver 206 such as manufactured by RF Innovonics, could receive signals from the RF transmitters indicative of alarms from wireless audio digital sensors. This would allow a wireless alarm network to be established. There is also the ability to accomplish two-way communication on some of the digital audio sensors, in which the monitoring station could communicate back as explained above. It is also possible to communicate using Voice over Internet Protocol (VoIP) from the premises controller to the central monitoring station and in reverse order from the central monitoring station to a premises controller, allowing greater use of an IP network.

It should be understood that intrusion noises include a broad spectrum of frequencies that incorporate different frequency components, which typically cannot be carried along the phone lines as analog information. The phone lines are typically limited in transmission range to about 300 hertz to about 3,300 hertz. By digitizing the audio signals, the data can be transmitted at higher frequency digital rates using different packet formats. Thus, the range of frequencies that the system can operate under is widened, and better information and data is transmitted back to the central monitoring station, as compared to the older analog security system such as shown in FIG. 1.

Figure 12:
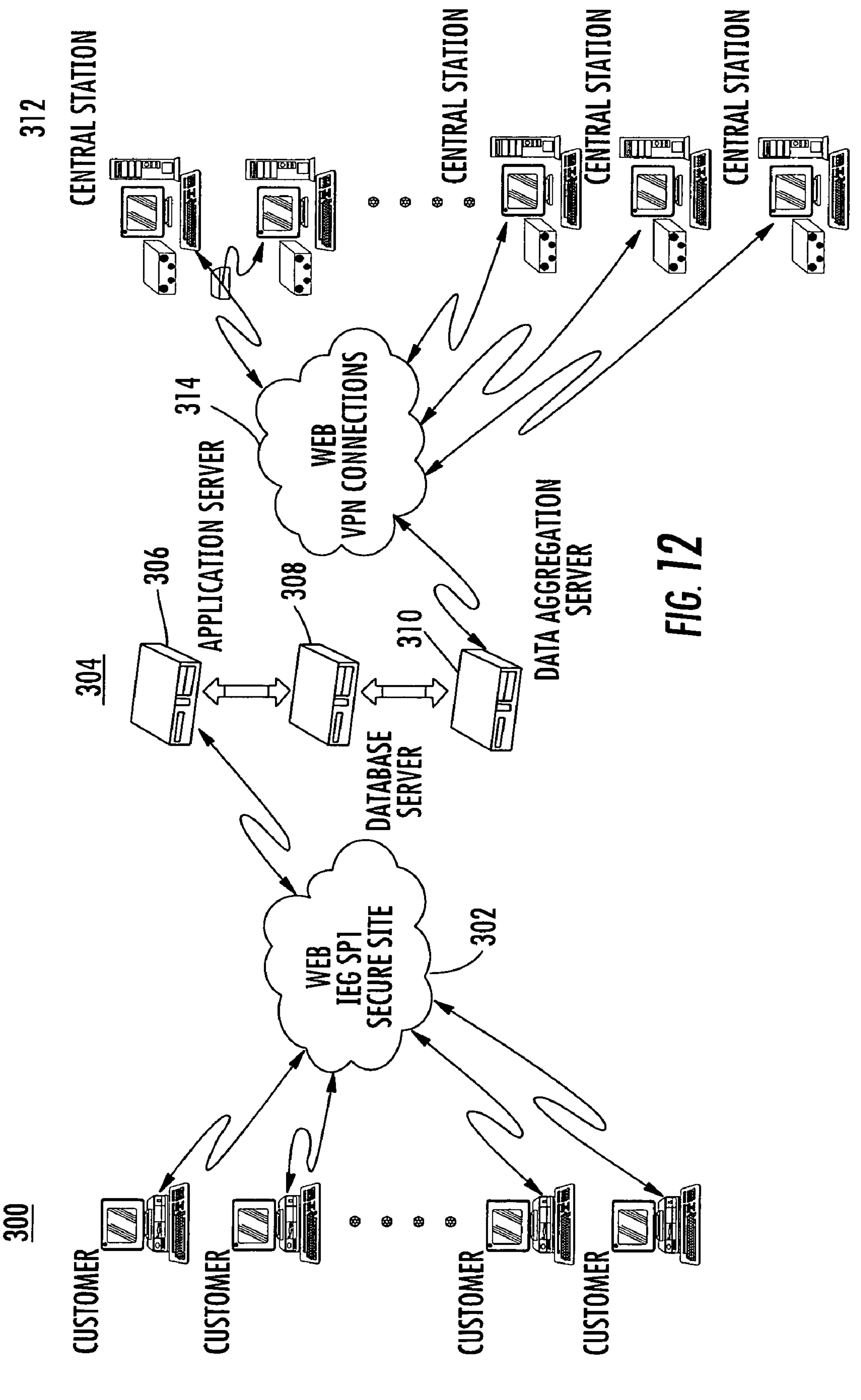
FIG. 12 is a block diagram showing various application, database and data aggregation servers operative with central monitoring stations as servers as an example of a security system of the present invention.

FIG. 12 shows the security system 40 in one non-limiting example of the present invention in which customers 300 can interact with a web IEG SP1 secure site 302, which in turn is operative with a colocation facility 304, such as a Verio facility, including an application server 306 database server 308 and data aggregation server 310. These servers connect to various remote central monitoring stations 312 through a web VPN network 314. Advanced Suite software could be used.

The described embodiments of the security system have advantages over prior art security systems, such as shown in FIG. 1. For prior art security systems, maintenance is difficult and there are hardware difficulties, for example, meeting Underwriter Laboratory requirements for the central monitoring station consoles, RAD slavery, and computers. In the security system of the present invention, the central monitoring stations could now include a separate user interface and port all code to .net. Features and functions can be updated as required and obsolete modules can be rewritten and new modules can be written. Modular releases can mitigate this risk to have time to the field. It is possible to retain functionality and retain the look and feel of the user interface. It is also possible to remove the Underwriter Laboratory requirement from computers.

The enhanced operating efficiency includes load balancing, decreased activations, decreased misses, increased accounts per monitor, and integrated digital capability for the alarm system. Disaster recovery is possible with shared monitoring, for example, on nights and weekends. This enables future internet protocol or ASP business modules. The existing wired control panel used in prior art systems is expensive to install and requires difficult programming. It has a high cost to manufacture and requires analog technology.

The premises controller 66 as part of a control panel is operative with digitized audio and designed for use with field equipment having addressable module protocols. The 300 baud rate equipment of prior art systems, such as explained with reference to FIG. 1, can be replaced with devices that fit into PCMCIA slots and operative at 56K or higher rates. Written noise canceling algorithms can enhance digital signal processing. This design can be accomplished with a contemporary microcontroller (or microprocessor). The system also supports multiple communications media including telephone company, DSL, cable modem and a digital cellular systems. It enables a series topology with full digital support. There is a lower cost to manufacture and about 40% reduction in the cost of a control panel in one non-limiting example. It also allows an interface for legacy control panels and digital audio detection and verification. It allows increased communication speeds. It is IP ready and reduces telephone company infrastructure costs.

There are many benefits, which includes the digitizing of audio at the audio sensors. Digital signal processing can occur at the audio sensor, thus eliminating background noise at the audio sensor. For example, any AC humming could be switched on/off, as well as other background noises, for example a telephone or air compressor noise. It is also possible to reduce the audio to a signature and recognize a likely alarm scenario and avoid false alarm indications for system wide noise, such as thunder. The digital audio sensors could record five seconds of audio data, as one non-limiting example, and the premises controller as a control panel can process this information. With this capability, the central monitoring station would not receive 25 different five-second audio clips to make a decision, for example, which could slow overall processing, even at the higher speeds associated with advanced equipment. Thus, a signature can be developed for the audio digital sensor, containing enough data to accomplish a comparison at the premises controller for lightning strikes and thunder.

Although some digital audio can be stored at the premises controller of the control panel or a central monitoring station, it is desirable to store some audio data at the digital audio sensors. The central monitoring station can also store audio data on any of its servers and databases. This storage of audio data can be used for record purposes. Each audio sensor can be a separate data field. Any algorithms that are used in the system can do more than determine amplitude and sound noise level, but can also process a selected frequency mix and duration of such mix.

There can also be progressive audio. For example, the audio produced by a loud thunder strike could be processed at the digital audio sensor. Processing of audio data, depending on the type of audio activation, can also occur at the premises controller at the control panel or at the central monitoring station. It is also possible to have a database server work as a high-end server for greater processing capability. It is also possible to use digital verification served-up to a client PC from a central monitoring station server. This could allow intrusion detection and verification, which could use fuzzy logic or other artificial intelligence.

The system could use dual technology audio sensors, including microwave and passive infrared (PIR) low energy devices. For example, there could be two sets of circuitry. A glass could break and the first circuitry in the audio sensor could be operative at microamps and low current looks for activation at sufficient amplitude. If a threshold is crossed, the first circuitry, including a processor, initiates operation of other circuitry and hardware, thus drawing more power to perform a complete analysis. It could then shut-off. Any type of audio sensors used in this system could operate in this manner.

The circuit could include an amplitude based microphone such that when a threshold is crossed, other equipment would be powered, and the alarm transmitted. It could also shut itself off as a two-way device. It is possible to have processing power to determine when any circuitry should arm and disarm or when it should “sleep.”

As noted before, there can be different levels of processing power, for example at the (1) audio sensor, (2) at the premises controller located the control panel, or (3) the central monitoring station, where a more powerful server would typically be available. The system typically eliminates nuisance noise and in front of the physical operator at a central monitoring station. Any type of sophisticated pattern recognition software can be operable. For example, different databases can be used to store pattern recognition “signatures.” Digital signal processing does not have to occur with any type of advanced processing power but can be a form of simplified A/D conversion at the microphone. It is also not necessary to use Fourier analysis algorithms at the microphone.

This application is related to copending patent applications entitled, “SYSTEM AND METHOD FOR MONITORING SECURITY AT A PLURALITY OF PREMISES,” which is filed on the same date and by the same assignee and inventor, the disclosure which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A security system for monitoring security at a premises comprising:

a premises controller located at the premises;

a plurality of audio sensors located at the premises and spaced apart from the premises controller, each audio sensor receives audio signals and converts the audio signals to digitized audio signals, each audio sensor including a microphone, a memory storing false alarm digital signatures, and a processor being operative to compare a digitized audio signal received by the audio sensor with the stored false alarm digital signatures stored within said memory to determine whether an alarm condition exists and in the event of the alarm condition being operative to make the digitized audio signal available to the premises controller; and a central monitoring station located remote from the premises that receives the digitized audio signals from the premises controller and converts the digitized audio signals into audible audio for an operator that is monitoring the premises, wherein at least one of the stored false alarm digital signatures is provided from the central monitoring station.

2. The security system according to claim 1, wherein at least one of the audio sensors includes a transceiver for receiving a communications signal from said central monitoring station and transmitting a communications signal to said central monitoring station.

3. The security system according to claim 2, wherein said communications signal comprises a signal representing a voice.

4. The security system according to claim 1, wherein said central monitoring station includes a server, and further comprising a client in communication with said server for accessing said server and receiving data regarding security.

5. The security system according to claim 4, and further comprising a communications network interconnecting said client and server.

6. The security system according to claim 5, wherein said client and server communicate through an internet.

7. The security system according to claim 5, wherein said communications network comprises a local area network.

8. The security system according to claim 1, wherein said central monitoring station includes a first receiver for receiving digitized audio signals generated by the plurality of audio sensors and a second receiver for receiving analog audio signals from analog audio sensors located at the premises.

9. A security system for monitoring security at a premises comprising:

a plurality of audio sensors located at the premises that receive audio signals generated at the premises and convert the audio signals to digitized audio signals;

a data bus interconnecting each of the audio sensors and receiving the digitized audio signals thereon, wherein each audio sensor includes an identifying data address on the data bus;

a premises controller located at the premises and interconnected to said data bus for receiving said digitized audio signals from each of the audio sensors, the premises controller being operative to determine when multiple audio sensors provide digitized audio signals at once whether the digitized audio signals correspond to a false alarm; and a central monitoring station located remote from the premises and interconnected to said premises controller for receiving from the premises controller the digitized audio signals which correspond to alarm conditions for further processing.

10. The security system according to claim 9, wherein said central monitoring station is operative for converting digitized audio signals into audio for monitoring by an operator.

11. The security system according to claim 9, wherein one or both of said premises controller and central monitoring station are operative for selectively addressing each audio sensor on said data bus for identifying a selected audio sensor and transmitting or receiving data to or from a selected audio sensor.

12. The security system according to claim 9, wherein each audio sensor includes a processor that is operative for determining whether any digitized audio signals are indicative of an alarm condition and should be received at the central monitoring station.

13. The security system according to claim 9, wherein said central monitoring station includes a server, and further comprising a client in communication with said server for accessing said server and obtaining information regarding the security system.

14. A method for monitoring security at a premises, which comprises:

providing a plurality of audio sensors and a premises controller at the premises, the plurality of audio sensors communicating with the premises controller over a digital network;

converting an audio signal at the premises into a first digitized audio signal at a first audio sensor located at the premises;

converting the audio signal at the premises into a second digitized audio signal at a second audio sensor located at the premises;

receiving the first digitized audio signal at the premises controller;

receiving the second digitized audio signal at the premises controller;

determining with the premises controller if the first digitized audio signal and the second digitized audio signal correspond to a premises wide false alarm;

when the first digitized audio signal and the second digitized audio signal are determined to not correspond with the premises wide false alarm transmitting the first digitized audio signal and the second digitized audio signal to a central monitoring station; and converting the first digitized audio signal and the second digitized audio signal into audio for an operator that is monitoring the premises.

15. The method according to claim 14, which further comprises transmitting the digitized audio signal from the central monitoring station to a client for monitoring, the client being spaced apart from the central monitoring station.

16. The method of claim 14, further comprising the step of:

monitoring radio waves in the vicinity of the premises, wherein the step of determining with the premises controller if the first digitized audio signal and the second digitized audio signal correspond to a premises wide false alarm is in part based on the monitored radio waves.

17. The security system of claim 9, further comprising an AM antenna operatively coupled to the premises controller to monitor radio waves in the vicinity of the premises, the radio waves providing an indication of the presence of lightning.

18. The security system of claim 9, wherein the central monitoring station provides false alarm digital signatures to the plurality of audio sensors, each audio sensor storing the false alarm digital signatures in a memory associated with the audio sensor.

19. The security system of claim 18, wherein each of the audio sensors digitizes the audio it receives and compares the digitized audio to the false alarm digital signatures, the digitized audio being sent to the premises controller if it does not correspond to a false alarm digital signature.

* * * * *